(12) United States Patent
Diaz et al.

(10) Patent No.: US 10,812,680 B2
(45) Date of Patent: Oct. 20, 2020

(54) SYSTEM AND METHOD FOR SECURELY ACCESSING, MANIPULATING AND CONTROLLING DOCUMENTS AND DEVICES USING NATURAL LANGUAGE PROCESSING

(71) Applicant: gabi Solutions, Inc., Fairfield, NJ (US)

(72) Inventors: Luis J. Diaz, Chester, NJ (US); Norman Sherman, Fair Lawn, NJ (US)

(73) Assignee: gabi Solutions, Inc., Fairfield, NJ (US)

( * ) Notice: Subject to any disclaimer, the term of this patent is extended or adjusted under 35 U.S.C. 154(b) by 0 days.

(21) Appl. No.: 16/135,202

(22) Filed: Sep. 19, 2018

(65) Prior Publication Data

US 2019/0373136 A1    Dec. 5, 2019

Related U.S. Application Data

(63) Continuation-in-part of application No. 16/029,191, filed on Jul. 6, 2018, which is a continuation-in-part of application No. 15/997,236, filed on Jun. 4, 2018.

(51) Int. Cl.
| | |
|---|---|
| *H04N 1/44* | (2006.01) |
| *G06F 21/32* | (2013.01) |
| *G06Q 20/32* | (2012.01) |
| *G06F 21/60* | (2013.01) |
| *H04L 9/06* | (2006.01) |

(52) U.S. Cl.
CPC ............ *H04N 1/442* (2013.01); *G06F 21/32* (2013.01); *G06F 21/602* (2013.01); *G06F 21/608* (2013.01); *G06Q 20/322* (2013.01); *H04L 9/0637* (2013.01); *H04N 2201/0094* (2013.01)

(58) Field of Classification Search
CPC ............ H04N 1/442; H04N 2201/0094; G06F 21/32; G06F 21/602; G06F 21/608; G06Q 20/322; G06Q 20/401; G06Q 20/4016; H04L 9/0637; H04L 63/10
See application file for complete search history.

(56) References Cited

U.S. PATENT DOCUMENTS

| | | | |
|---|---|---|---|
| 6,088,717 A * | 7/2000 | Reed | H04L 29/06 707/999.01 |
| 9,477,737 B1 | 10/2016 | Charyk et al. | |
| 2004/0122625 A1 | 6/2004 | Nasser et al. | |

(Continued)

OTHER PUBLICATIONS

The International Search Report and Written Opinion, dated Feb. 14, 2019, in the related PCT Appl. No. PCT/US2018/035863.

(Continued)

*Primary Examiner* — Iriana Cruz

(57) ABSTRACT

A system and method for securing transaction between a user and an electronic device or an electronic document, where the device or document is accessible and controllable by a user with a user electronic device. A transaction request is initiated by the user electronic device, the electronic device is connectable to a network and the electronic document is accessible over the network. The system includes a smart box connectable to the network and having a processor and memory storing general purpose and special purpose software. One or more monitoring bots storable in the memory of the smart box are configured to collect data for the transaction request pertaining to at least one of the user, a process or a the transaction.

23 Claims, 20 Drawing Sheets

(56) References Cited

U.S. PATENT DOCUMENTS

| | | |
|---|---|---|
| 2004/0215533 A1 | 10/2004 | Doeberl et al. |
| 2005/0038724 A1 | 2/2005 | Roever et al. |
| 2005/0071348 A1 | 3/2005 | Laicher et al. |
| 2012/0060142 A1 | 3/2012 | Fliess et al. |
| 2012/0262749 A1 | 10/2012 | Yamamoto |
| 2013/0162411 A1 | 6/2013 | Moses et al. |
| 2013/0342866 A1 | 12/2013 | Hansen et al. |
| 2015/0262148 A1* | 9/2015 | Nichols .............. G06Q 20/4016 705/42 |
| 2016/0277439 A1 | 9/2016 | Rotter et al. |
| 2017/0012961 A1 | 1/2017 | White et al. |
| 2017/0046698 A1* | 2/2017 | Haldenby .......... G06Q 20/0655 |
| 2017/0280003 A1 | 9/2017 | Haba et al. |
| 2019/0272541 A1* | 9/2019 | Koeppel .............. G06Q 20/322 |
| 2019/0294786 A1* | 9/2019 | Villavicencio ........ G06F 21/554 |

OTHER PUBLICATIONS

The International Search Report and Written Opinion, dated Jan. 24, 2019, in the related PCT Appl. No. PCT/US18/51648.
The International Search Report and Written Opinion, dated Apr. 23, 2019, in the related PCT Appl. No. PCT/US18/66000.

* cited by examiner

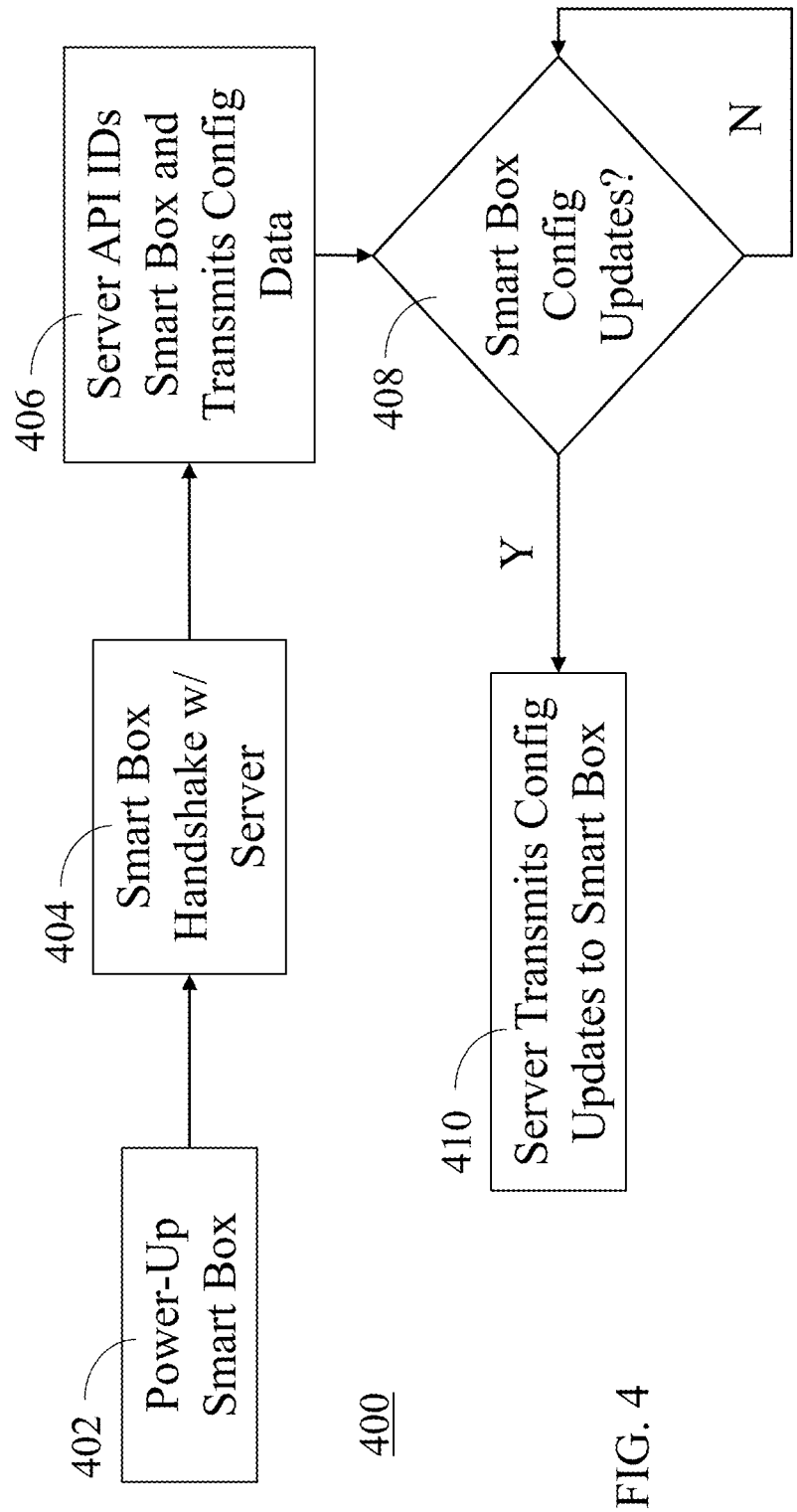

SYSTEM AND METHOD FOR SECURELY ACCESSING, MANIPULATING AND CONTROLLING DOCUMENTS AND DEVICES USING NATURAL LANGUAGE PROCESSING

CROSS-REFERENCE TO RELATED APPLICATIONS

This application is a continuation-in-part of application Ser. No. 16/029,191, filed on Jul. 6, 2018 and entitled "System and Method for Providing User-Centric Content to an Electronic Device," which is a continuation-in-part of application Ser. No. 15/997,236, filed on Jun. 4, 2018 and entitled "System, Network Architecture and Method for Accessing and Controlling an Electronic Device." Each of these applications is hereby incorporated by reference herein in its entirety.

FIELD OF THE INVENTION

The present invention is direction to a system and method for securely accessing, manipulating and controlling documents and devices using natural language processing.

BACKGROUND OF THE INVENTION

Electronic devices are continually getting "smarter" as greater processing power becomes available in smaller and smaller packages. With many types of electronic devices now ubiquitously part of personal and professional life they occupy a unique position in our lives. They provide an easy-to-use, powerful tool that can be used to improve, and even to introduce paradigm shifts to how certain things are done. Listening to music is one simple example. This presents endless opportunity for applications on a smartphone or other user electronic devices.

It seems, however, that most of the productivity improvements introduced through devices like personal devices like the smartphone are personal, rather than professional. It has become easier to find things like restaurants, stores, etc. using navigation features of a smartphone. It has become easier to keep in touch through phone calls, text messaging, social network accounts like Twitter and Facebook, and email. It has become easier to take and share pictures. Myriad other applications have emerged that attempt to improve personal life. Professional life has not been overlooked, but it seems that the improvements here are more limited in type, scope and impact. For example, it has also become easier to keep in touch professionally through phone calls, text messaging and email. And it has become easier to maintain professional contacts and to gain access to those contacts anytime, anywhere. It seems, however, the the professional improvements brought about through the portability and availability of computer processing power have not presented a significant shift in how business is done. Professional improvements seem to fall into the category of improved efficiency, but certainly nothing considered a paradigm shift. There remain many opportunities for such improvements to professional life that are possible with more intelligent personal electronic devices like the smartphone.

Electronic devices tend to be designed and configured for a particular purpose or function. While electronic devices may be multi-function devices, e.g., a multi-function printer, or a smart phone that can make phone calls, take pictures and play music, the function(s) are typically pre-programmed, and a user of the device is limited to these pre-programmed functions. However, because an electronic device is pre-programmed for a particular function or functions does not mean those are the only functions the device is capable of performing. To the contrary, many electronic devices are capable of performing functions for which they are not programmed. Unfortunately, a user is limited to the pre-programmed and available functions of an electronic device unless the user pays to upgrade the device to enhance and/or expand its functionality. It is currently not possible for a user, in real-time, to use a personal electronic device like a smartphone to access and control a target electronic device in a way that changes the function or functionality of the target device.

Consider a multi-function printer ("MFP"), as one example. Although this device is configured to perform certain functions, e.g., print, scan, copy, email, it is also able to perform functions beyond these. For example, a typical MFP is capable of scanning a document and sending it via email by accessing an address book stored in the MFP provided that the user is in front of the MFP and directly controlling it. Thus it is possible for an MFP to email documents using its own address book and only using documents it scans. These functions of the MFP, as examples, are available but limited by the pre-programmed configuration of the MFP.

In addition, an MFP has on-board intelligence beyond what is necessary to control the core functions of the printer. MFPs have networking functionality, enbabling direct or wireless connection to a network, and authorization functionality to prevent unauthorized use of or access to the MFP, as two examples.

In addition to the above-noted shortcomings of the prior art, it is also currently not possible to access significant types and amounts of data captured by an MFP, and use that data to intelligently manage the use and operation of the MFP. It is also currently not possible to create automatic service events for an MFP based upon usage data and most anticipated or most common service requirements. It is also currently not possible to remotely construct and control custom operations for an MFP such as, by way of non-limiting example, a custom print job that involves a sequence of discrete steps earned out by the MFP with or without user interaction.

With improved and enhanced user-centric access and control in accordance with embodiments of the present invention, security of the systems, documents, information, etc. to which a user will have access is a significant issue. It is desirable to couple certain safeguards with the improved and enhanced user-centric access.

What is lacking in the prior art is a system and/or method that addresses and/or overcomes the above-described shortcomings of the prior art.

SUMMARY OF THE INVENTION

The present invention is directed to solving the technical problem of providing security for an electronic device, system, document, etc. that is accessible and controllable by a user with a user electronic device. As used herein, the phrase "electronic device" is used to describe any of a singular electronic device, or one or more electronic devices connected or connectable via any means that can communicate with each other. This phrase is further used in an expansive way, intended to encompass any type of known or hereafter-developed electronic device usable in connection with, or suitable for carry tag out all or part of, the present invention.

An embodiment of the present invention is directed to a system configured to secure a transaction between a user and au electronic device or an electronic document. The transaction is initiated using a user electronic device, and the electronic device is connectable to a network and the electronic document is accessible over the network. The system comprises a smart box connectable to the network and having a processor and memory having stored therein general purpose software, and having storable therein smart box special purpose software. The system further comprises a user device control installable on the user electronic device, wherein the user device control enables a user of the user electronic device to initiate the transaction. The system still further comprises a bot storable in memory of the smart box, configured to collect data for the transaction, and pertaining to at least one of the user, a process or the transaction.

A system according to an embodiment of the present invention further comprises a user account file associated with the user and stored in memory of a server, the user account file containing at least one user permission, wherein the bot is configured to collect data corresponding to the at least one user permission, and to provide the data to the server, wherein a processor of the server is configured to determine whether to allow or deny the transaction by comparing the data with the at least one user permission.

In a system according to an embodiment of the present invention, the smart box processor is further configured to cause the bot to transmit the data to a server having a processor and server special purpose software, and wherein the server special purpose software is configured to cause the server processor to determine, from the data, whether the transaction is an anomaly, and to cause the smart box processor to deny the transaction when the transaction is an anomaly.

In a system according to an embodiment of the present invention, the smart box processor is further configured to cause the bot to transmit the data to a server having a processor and server special purpose software, and wherein the server special purpose software is configured to cause the server processor to determine, from the data, whether the transaction is an anomaly, and to cause the smart box processor to allow the transaction when the transaction is an anomaly.

In a system according to an embodiment of the present invention, the server special purpose software is further configured to cause the server processor to cause the smart box processor to allow only the transaction when the transaction is an anomaly.

In a system according to an embodiment of the present invention, the smart box processor is further configured to cause the bot to transmit the data to a server having a processor and server special purpose software, and wherein the server special purpose software is configured to cause the server processor to determine, from the data, whether the transaction is an anomaly, to notify an administrator when the transaction is an anomaly, to receive an instruction from the administrator, and to cause the smart box processor to carry-out the instruction.

In a system according to an embodiment of the present invention, the transaction comprises at least of one of accessing, controlling or manipulating the electronic device or electronic document.

In a system according to an embodiment of the present invention, the transaction comprises causing the electronic device to execute a command.

In a system according to an embodiment of the present invention, the transaction comprises executing a command on the electronic device.

In a system according to an embodiment of the present invention, the electronic device is a multi-function printer (MFP), and wherein the smart box is connectable to the MFP as a super-user.

In a system according to an embodiment of the present invention, the bot comprises machine-executable instructions that, when executed, cause the smart box processor to collect data about the transaction that may be used by the smart box processor to access, manipulate or control an electronic device or electronic document.

A system according to an embodiment of the present invention further comprises an application programming interface ("API") on a cloud-based server configured to receive data from the bot and determine whether the transaction is an anomaly.

In a system according to an embodiment of the present invention, the API provides blockchain functionality to create a cryptographic structure and to verify a data unit.

In a system according to an embodiment of the present invention, the verified data unit is for the transaction.

Another embodiment of the present invention is directed to a method for securing a transaction between a user and an electronic device or an electronic document. The transaction is initiated using a user electronic device, the electronic device is connectable to a network, and the electronic document is accessible over the network. The method is performed by at least one processor operable by machine-readable instructions. The method comprises the step of providing a smart box connectable to the network, the smart box having a central processing unit comprising a processor and memory having stored therein general purpose software, and having storable therein a hot and smart box special purpose software. The smart box special purpose software is configured for receiving a request to authenticate the user using biometric data of the user, receiving a command to control an electronic device or access an electronic document, receiving a determination of whether the transaction is an anomaly, and allowing or denying the transaction based upon the determination of whether the transaction is an anomaly. The bot is at least one of user-centric, process-centric or transact ion-centric, and is configured for collecting data for the transaction and transmitting the data to a cloud-based server.

In a method according to an embodiment of the present invention, the bot is a user-centric bot, and further configured to activate in response to a request to authenticate from a specific user.

In a method according to an embodiment of the present invention, the bot is a process-centric bot, and further configured to activate in response to a request to carry-out a specific process.

In a method according to an embodiment of the present invention, the bot is a transaction-centric bot, and further configured to activate in response to initiation of a transaction request by a user.

In a method according to an embodiment of the present invention, the step of receiving a request to authenticate the user using biometric data of the user further comprises receiving an audio signal from an audio input device of the user electronic device or proximate the electronic device.

In a method according to an embodiment of the present invention, the smart box special purpose software is further configured for providing an application programming interface ("API") to a cloud-based server, wherein the API is configured to receive data from the bot and determine whether the transaction is an anomaly.

In a method according to an embodiment of the present invention, the API provides blockchain functionality to create a cryptographic unit from the received data, and to verify the data.

In a method according to an embodiment of the present invention, the data is for the transaction.

In a method according to an embodiment of the present invention, the smart box special purpose software is further configured for receiving an instruction to allow the transaction when the transaction is an anomaly.

In a method according to an embodiment of the present invention, the instruction is only for the transaction.

The present invention introduces a paradigm shirt in the way electronic devices are accessed and controlled by creating a user-centric environment that transfers control over the function and functionality of a target electronic device from the device itself (i.e., a device-centric environment) to a user electronic device (i.e., a user-centric environment). While the prior art teaches rudimentary access to and control of an electronic device from a user electronic device (e.g., controlling your thermostat from your mobile phone), embodiments of the present invention enable a user to not only control the electronic device, but to add functionality, change functionality, or otherwise modify the operation of the electronic device. Such an innovative and unconventional technological solution to the technological problem of controlling electronic devices and systems is not found in the prior art. Advantageously, the user-centricity created by the present invention places, in each unique user's hands, the ability to effect such control over a target electronic device in accordance with that unique user's needs or desires. And because of the ubiquity of personal user electronic devices, the present invention eliminates user learning curves for new devices, integration issues associated with adding/replacing devices, and restrictions on available functionality from pre-configured devices.

Not only does the present invention use a conventional device in an unconventional way, embodiments of the present invention are tied to a specific structure, connection and arrangement of components, purposefully structured, connected and arranged to achieve an inventive technological solution to a technological problem specific to electronic devices and systems—the inability of a user to control the function and functionality of such devices and systems. Whereas the prior art, representing a device-centric environment, restricts control of electronic devices and systems to either authorized entities (e.g., manufacturers, service personnel, etc.), users in proximity, or users with only access and control limited to the pre-configuration of the device, the present invention creates a user-centric environment that enables users to each independently and separately control not only the function but also the functionality of electronic devices and systems. Thus, an intelligence aspect of electronic devices and systems is relocated from the device itself to an edge of a network within which the devices and systems operate—one such edge being defined from the perspective of each unique user's electronic device looking inward into the network—thus creating a user-centric network architecture and environment. That intelligence aspect is control over the function and functionality of the devices and systems which, in accordance with embodiments of the present invention, is now in the hands of each user.

Embodiments of the present invention also provide a method and system for securing a user-initiated transaction carried-out by an electronic device, and/or carried out by and/or on an electronic document to address shortcomings associated with ensuring security when accessing, manipulating, and/or controlling an electronic device and/or electronic document using natural language processing.

In accordance with embodiments of the present invention, a number of advantages are now realized. By recognizing that personal electronic devices are ubiquitous, and by further recognizing that for each such device, the user interface and use of the device can be considered universal (i.e., the same for each device within a category of devices), the present invention provides universality in its solution to the problems with the prior art discussed above. More specifically, the present invention advantageously recognizes that a user of a smartphone, for example, does not encounter a learning curve when additional features are added to the smartphone, or when the smartphone is used in a new way, as with the present invention. Rather, the introduction of new features and functionality to the user via the user's smartphone is relatively seamless. Thus, the present invention enables a user to change the function and/or functionality of a target electronic device without having to learn how to use that device to perform the new/changed function.

The present invention also advantageously provides universality across controllable electronic devices. Regardless of the type of device, or of the manufacturer of a device type (e.g., HP, Dell, Canon, etc. for MFPs) to be accessed and controlled, the present invention enables a user electronic device to access and control an electronic device by separating the user interface from the target electronic device and placing it with the user on a platform with which the user is familiar. The present invention thus makes its technology frictionless, as the user need not care or know about the type of electronic device being accessed or controlled to realize the advantages of the present invention.

The present invention also advantageously extends a periphery about an electronic device from in-fact proximity to the device, to a smart box connectable to the electronic device over a network, and to a user electronic device. In so doing, the present invention not only places access to and control over electronic devices to which the user desires to connect or interact in the user's hand, the present invention further makes such access and control user-centric. Thus the present invention introduces a paradigm shift from a device-centric world to a user-centric world with respect to accessing and controlling electronic devices in a way that enables the user to change the function or functionality of the device. Prior to the present invention, a user could access and control an electronic device, but the control was limited to the functions and functionality pre-programmed into the electronic device. In accordance with embodiments of the present invention, under the new user-centric paradigm, a user can change and/or add functionality to a target electronic device. What an electronic device is able to do is no longer limited to how it was programmed. Rather, the present invention places control of the functionality of an electronic device in the hands of a user, creating a user-centric, edge-based intelligence in a network.

In accordance with embodiments of the present invention, voice recognition technology may be used to cause a target electronic device to respond to voice commands when the target device is not configured for voice activation. In further accordance with embodiments of the present invention, a target electronic device can utilize 2-factor authentication such as, by way of illustration and not limitation, biometric authentication, by utilizing functionality native to a user electronic device and by causing, by virtue of the present invention, the target electronic device to employ 2-factor authentication. Thus the present invention leverages the nativity of a function (e.g., 2-factor biometric authentication) on the user electronic device to enable the MFP (i.e., the target electronic device) to respond as if the function is native to the MFP. In still further accordance with embodiments of the present invention, intelligent usage and management of a target electronic device is possible through access to, and collection and analysis of usage data already collected by the target device. Prior to the present invention, such data was not readily available, certainly not to users of the target electronic devices), and certainly not by these users to intelligently use and manage the target device.

Thus, in accordance with preferred embodiments pf the present invention, a system and method are disclosed that provide security for an electronic device, system, document, etc. that is accessible and controllable by a user with a user electronic device. That security may be provided by one or more of blockchain, multi-factor biometric authentication (e.g., voice authentication), and one or more monitoring bots.

BRIEF DESCRIPTIONS OF THE DRAWINGS

Embodiments of the present invention will now be described with reference to the following figures, wherein:

FIG. 4 is a flow diagram of a smart box start-up and configuration process in accordance with embodiments of the present invention;

DETAILED DESCRIPTION

The following describes exemplary embodiments of the present invention. It should be apparent to those skilled in the art from the disclosure provided herein that the described embodiments of the present invention are illustrative and not limiting, having been presented by way of example only. All features disclosed in this description may be replaced by alternative features serving the same or similar purpose, unless expressly stated otherwise. Therefore, numerous and various other embodiments are contemplated as falling within the scope and spirit of the present invention.

As used herein, the phrase personal electronic device or user electronic device means, by way of illustration and not limitation, smartphones, tablets, mobile computers, desk-top computers, mobile Internet devices, laptops, wearable computers, calculator watches, smartwatches, head-mounted displays, personal digital assistants, enterprise digital assistants, handheld game consoles, portable media players, calculators, digital still cameras, digital video cameras, personal navigation devices, and smart cards, or any other known or hereafter developed personal electronic device.

As used herein, the term "transaction(s)" when used in connection with user-centric control refers to any instruction, command, request, order, etc. provided by a user to access, manipulate, control, or otherwise interact with an electronic device or document.

Figure 1:
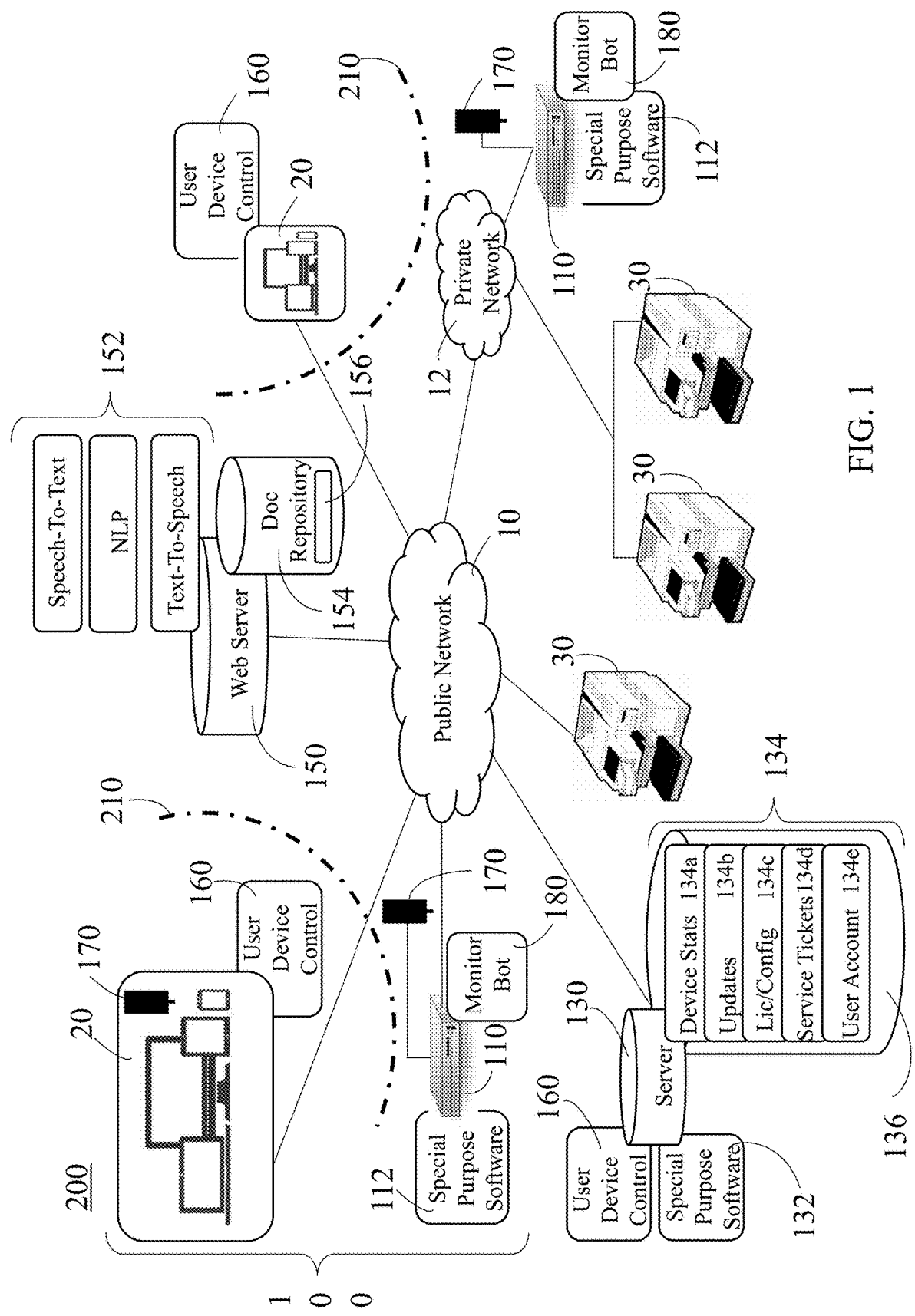
FIG. 1 is a schematic diagram of a system and network architecture in accordance with embodiments of the present invention.
Figure 2:
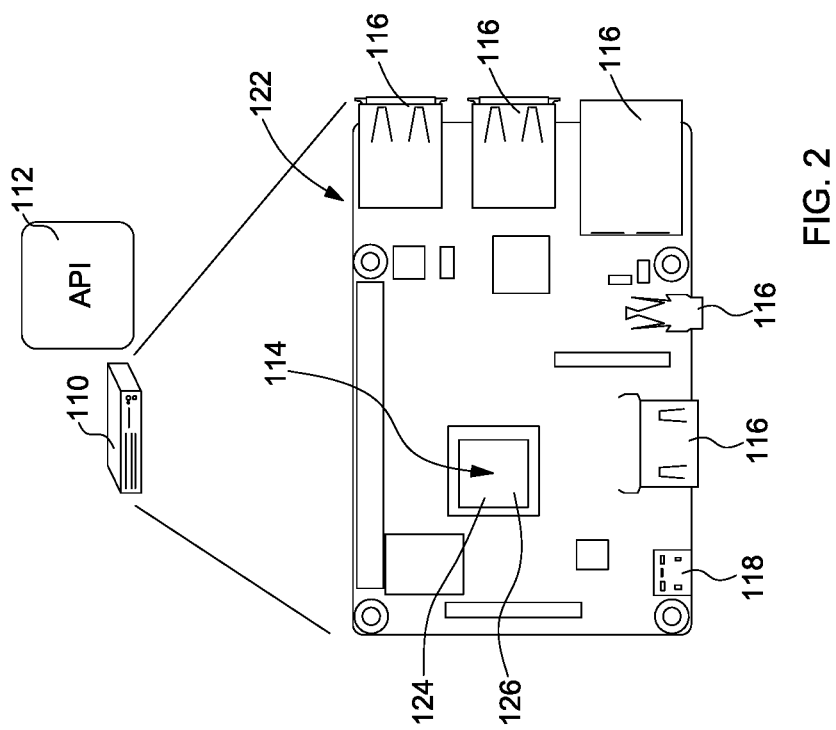
FIG. 2 depicts a single board computer of a smart box in accordance with embodiments of the present invention.
Figure 3:
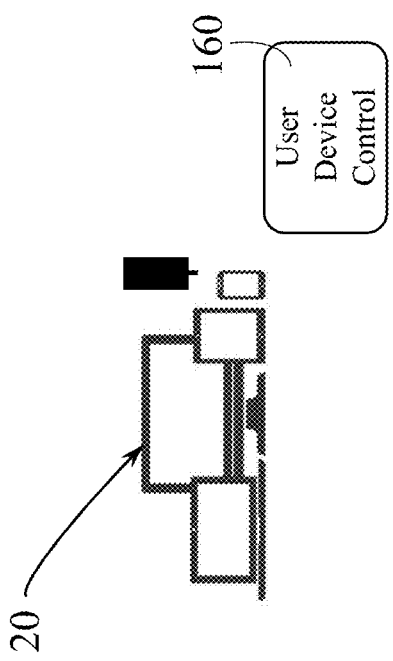
FIG. 3 depicts the structure and function of a user device control in accordance with embodiments of the present invention.

Referring next to the drawings in detail, FIGS. 1 and 2 respectively depict a schematic diagram of a system 100 and network architecture 200, and a single board computer 122 of a smart box 110 in accordance with embodiments of the present invention. The system 100 comprises a smart box 110, a user device control 160 installable on a user electronic device 20, and a bot 180 installable in memory of the smart box 110, that are connected or connectable to a private network 12 or a public network 10 and are in communication with each other and with electronic devices 30. Preferably, the smart box 110 and electronic devices 30 are part of and/or connectable to a private network 12. A server 130 may be provided in the private network 12, or public network 10, and the user electronic devices 20 are part of and/or connectable to a public network 10. Alternatively, the smart box 110 may be part of and/or connectable to the public network 10, yet be connectable to another smart box 110 or electronic device 30 that are both part of a private network 12. Embodiments of the present invention provide the user device control 160 at an edge 210 of the network, thus placing the ability to control the function or functionality of an electronic device in the hands of users at the network edge 210.

The server 130 may be implemented, by way of non-limiting example, at least in part based on the machine learning platform provided by Amazon Web Services (AWS) cloud computing and storage services. The server 130 carries out certain administrative functions of the present invention. For example, the server 130 communicates initially with a smart box 110 when the smart box 110 first connects to the network and comes on line. In this capacity, licensing and configuration data 134c previously saved as a data file 134 in server data storage 136 is communicated to the smart box 110 and usable by the smart box 110 for its initial configuration. Further configuration of the smart box 110 may be required and performed by an administrator, as described in more detail herein. The server 130 also communicates software updates to a smart box 110 as necessary, which are stored as an update data file 134b. This communication occurs automatically and is managed by a scheduler on one or both of the server 130 and smart box 110. The server 130 is also a repository for usage data and statistics for the electronic devices in the network 10, 12. The data and statistics are acquired from each electronic device 30 by the smart box 110, and communicated thereby to the server 130, where the data and statistics are stored as device stats 134*a* in a data file 134. A separate device stats file data file 134 is created for each target electronic device 30, and that file can be used to intelligently use and manage the target device 30. The server 130 also communicates initially with a user electronic device 20 through the user device control 160 to create an account for and authenticate the user, and to bring the user electronic device 20 online.

Figure 6:
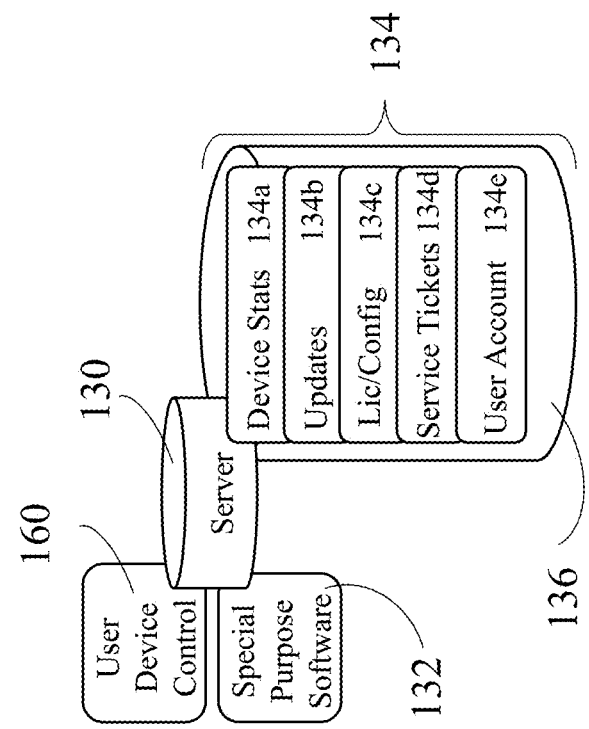
FIG. 6 depicts the structure and function of special purpose software of a server in accordance with embodiments of the present invention.

The server 130 has a processor and memory having stored therein general purpose software comprising commands or instructions executable by the processor for carrying out basic functions of the server 130, and special purpose software 132 comprising commands or instructions executable by the processor for carrying out aspects of the present invention. See also FIG. 6. The server 130 has data storage 136 that may be part of or separate from the server 130. One or more data files 134 created by use of the present invention are stored in the data storage 136 as one or more files or databases. Exemplary types or categories of files or databases are depicted in FIGS. 1 and 6 and comprise data relating to electronic devices 30 such as device statistics, updates and service tickets, and data relating to a user and the smart box 110 and user device control 160 such as licensing and configuration. For example, device stats 134*a* created by an electronic device 30 is capturable by the smart box 110, and may be transmitted thereby to the server 130 at predetermined times. Such device stats 134*a* are currently created by an MFP, for example, but are not currently capturable nor captured by any device other than the MFP. Embodiments of the present invention capture that data and transmit it to the server 130 for storage and later use. Data files 134 may also comprise update data 134*b* for updates for one or more electronic devices 30 that are transmittable, downloadable, etc. from the server 130 to the electronic device 30. Updates may include, by way of non-limiting example, updates for general operation and function of the smart box 110, and updates for operation and function of inventive aspects of the smart box 110. Data files 134 may further comprise licensing and configuration data 134*c* that is unique for, and specific to a particular smart box 110. Licensing and configuration data 134*c* generally comprises information provided by an administrator of a smart box 110, for example, that is used to define certain operational parameters for the smart box 110, as well as data provided by the server 130. For example, licensing and configuration data 134*c* for a company may include the formal of a user's email, the number of users, the number of electronic devices 30, identifiers for each electronic device 30 (e.g., IP address), codes specific to the company and/or a group or department within the company, an API key unique to each smart box 110 that comprises a license ID and machine key, essentially a user name and password for the smart box 110, and other data and information that serve to define connection and communication rules between a smart box 110, the server 130, a user electronic device 20, and one or more target electronic devices 30.

Data files 134 may also comprise service ticket data 134*d* collected by the smart box 110 from the electronic devices 30 with which it communicates. Service ticket data 134*d* may be generated by a user or by an electronic device 30, indicative of a state of the electronic device 30 that may require intervention, e.g., paper jam, toner cartridge replacement, etc.

In a preferred embodiment of the present invention, the server special purpose software 132 may comprise an application programming interface, or API, that functions as a REST-based API endpoint for communication with the smart box 110 and/or user electronic device 20. Communication between and among the various electronic devices may use java script object notation. The API special purpose software 132 is structured based upon sub-components that provide microservices within the API that may include, by way of non-limiting example, storing data received from a smart box 110 about one or more electronic devices 30, providing updates to a smart box 110, routing service ticket requests, and other selectively programmable microservices that may facilitate communication between and among smart boxes 110, user electronic devices 20, target electronic devices 30, electronic documents 156 in a document repository 154, and other devices and systems, either in the private network 12, the public network 10, or a combination of both. The special purpose software 132 may additionally comprise a user device control 160 uploadable to a user device 20 that provides a user interface 700 (see, e.g., FIG. 7A). While in a preferred embodiment the user device control 160 is an application downloadable by/to a user electronic device from an app store, an alternative embodiment provides the user device control 160 on the server 30.

The smart box 110 generally functions as a universal controller that manages and controls communication by, between and among the various electronic devices that comprise the present invention, as well as the various electronic devices and documents with which the present invention accesses, manipulates, and/or controls. The majority of communication by the user device 20 via the user device control 160 is received by or at least passes through the smart box 110. The smart box 110 is thus able to, and does in fact, capture much of the data and information created by use of the present invention, including data created by target electronic devices 30. The smart box 110 is thus also able to function as a sentry to ensure secure transactions with electronic devices and electronic documents. The special purpose software 112 of the smart box 110 functions as an API endpoint for the user device control 160. The smart box 110 also controls ail user access to and control of target electronic devices 30 and electronic documents 156 from a plurality of user device controls 160.

The smart box 110 comprises a single board computer 122 having a central processing unit 114 comprising a processor 124 and memory 126 having stored therein general purpose software comprising commands or instructions executable by the processor to carry out basic functions of the smart box 110. For example, basic functions of the smart box 110 enable the smart box 110 to power up and communicate and control communication over a variety of interfaces 116, such as USB, Ethernet, video, audio, and HDMI. Each smart box 110 may preferably be configured with dual Ethernet ports in order to communicate with each of an Ethernet-based private local area network 12 and an electronic device 30. Each smart box 110 serves us an intermediary that employs its Ethernet interface to monitor communications of its associated electronic devices 30 via the private network 12, provide instructions to be executed by the electronic device 30, and retrieve data from the electronic device 30.

An exemplary single board computer 122 is available from the Raspberry Pi Foundation, model number Raspberry Pi 3 Model B+. This model is a credit card-sized computer powered by a Broadcom BCM2835 central processing unit (system-on-a-chip) 114 that includes a 32-bit ARM 1176JZFS processor 124, clocked at 700 MHz, a Videocore IV Graphics Processing Unit, and 256 MB of random access memory 126. The single board computer 122 is powered by a 5V AC charger connectable to a micro USB port 118. It will be obvious to persons skilled in the art and from the disclosure provided herein that other single board computers may be used in connection with the present invention.

The smart box 110 further comprises special purpose software 112 storable in memory 126 comprising commands or instructions executable by the processor that enables the smart box 110 to carry out certain inventive aspects of the present invention. In a preferred embodiment, the special purpose software 112 is an API with programmable functionality. The API special purpose software 112 is structured based upon sub-components that provide microservices within the API that may include, by way of non-limiting example, copy, email, collect, and service, as well as other selectively programmable functionality. Any of the foregoing may be enhanced by voice-enable or two-factor biometric authentication aspects of embodiments of the present invention. Each microservice calls a unique API path for the desired functionality—the path being to at least one of the smart box 110 and server 130. The special purpose software 112 is selectively programmable and adaptable to change/add/delete one or more functions it provides.

The monitor bots 180 depicted in FIG. 1 may be embodied as special purpose software that causes the smart box processor to monitor certain activities of the smart box 110 and/or electronic device 30 or electronic document 156. Each monitor bot 180 may be configured to monitor specific activities such as, by way of non-limiting example, hard drive/memory access, I/O port access (e.g., USB, micro-USB, etc.) Wi-Fi access, email usage, include permitted and prohibited domains, time/day usage, transaction size, data flooding, and other activities identified as actual or potential risks to the systems, documents, information, etc. accessible and controllable by a user in accordance with the present invention. A bot 180 may be configured for 24/7 monitoring, functioning as an always alert sentry for electronic devices 30 and electronic documents 156. For example, a bot 180 may be configured to regularly wipe clean a hard drive of an electronic device 30 to ensure that no data remains on that hard drive. A bot 180 may also or alternatively be configured to ensure that the IP address for an electronic device is not the factory default IP address, as that address is more susceptible to hacking. A bot 180 may alternatively be configured for industry specific monitoring, such as, by way of non-limiting example, financial services, medical records (e.g., HIPPA), and any other industry in which access to, manipulation of, and control of electronic devices and electronic documents using natural language processing present security issues.

An exemplary process 400 for initial configuration of the smart box 110 is depicted in FIG. 4. As an initial step, a smart box 110 is pre-programmed with an API key comprised of a license ID and machine key, each unique to the smart box 110 and that together function as a user name (license ID) and password (machine key). Prior to a smart box 110 first use, it is programmed with certain data and information to enable it to connect to a server 130 upon power-up and to effect a handshake between the server 130 and smart box 110. The smart box 110 initially cycles through a start-up sequence or process when power is first applied at step 402. The general purpose software of the smart box 110 establishes a connection over the network 10 or private network 12 to the server 130 at step 404 and transmits the API key to the server 130—communicating with the server API 132. The server API 132 is configured to detect and identify the smart box 110, and to transmit configuration data to the smart box 110, at step 406. The configuration data was previously constructed as licensing and configuration data 134c stored in data storage 134 of the server 130 based upon information provided by a systems administrator, for example. Configuration of the smart box 110 is controlled by the API special purpose software 112, and is set by the licensing and configuration data file 134c. Once the licensing and data configuration file 134c is installed on the smart box 110, the smart box 110 is operational and ready to connect with user electronic devices 30 and carry out aspects of the present invention.

Configuration updates for the smart box 110 are transmitted by the server 130 at step 410 as update data 134b if updates are available, as determined by the server 130 at step 408. The server 130 and/or smart box 110 may be configured to transmit/receive regular software updates. At least one of the server API 132 and smart box API 112 ensures that the updates are intelligently communicated, ensuring that updates to the smart box 110 do not bypass sequential updates, i.e., preventing an update from version 1.1 to version 1.9, where intermediate versions contain important updates that may or may not be included in the most recent update.

Figure 5:
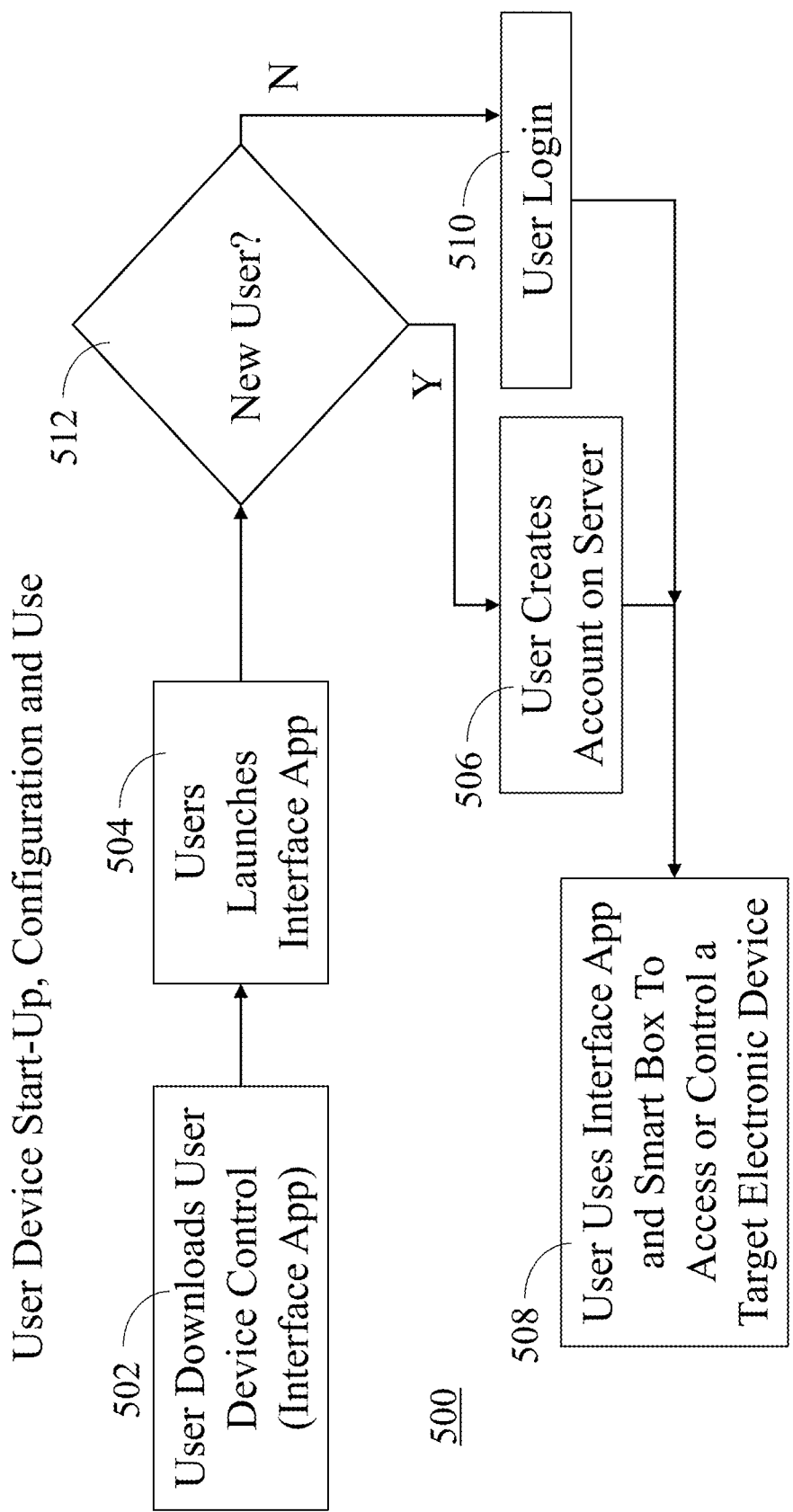
FIG. 5 is a How diagram of a user electronic device start-up, configuration and use process in accordance with embodiments of the present invention.

The user device 20 may be any electronic device capable of carrying out aspects of the present invention as disclosed herein. Preferred embodiments include, by way of non-limiting example, a smartphone or tablet. Other electronic devices 20 are also disclosed herein, and are thus contemplated by, and within the scope and spirit of the present invention, as are any hereafter developed electronic devices capable of carrying out aspects of the present invention as disclosed herein. A user desiring to utilize the present invention installs the user device control 160 on a user electronic device 20. The user device control 160 is preferably an app downloadable to the user electronic device 20 from an app store or from the server 130. Once the app is installed the user can launch the user device control 160 to utilize aspects of the present invention. Initially, a user must configure his/her user device 20 to carry out aspects of the present invention. With reference to FIG. 5, a startup and configuration process 500 for a user electronic device 20 is depicted. The user first downloads the user device control 160 from an app store or from the server 130 to the user device 20, at step 502, and launches the user device control 160 at step 504. When run, the user device control 160 provides a plurality of user interfaces that enable the user to utilize aspects of the present invention. The user device control 160 determines if the user is a new user at step 512, in which case the user can create an account on the server 130, step 506, and thereafter use the user device control 160, smart box 110 and server 130 to access and control a target electronic device 30 in accordance with embodiments of the present invention. Returning users, as detected at step 512, can login at step 510 and thereafter use the user device control 160, smart box 110 and server 130 to access and control a target electronic device 30 in accordance with embodiments of the present invention. As depicted in FIGS. 7A-7J, the user device control 160 provides interfaces and carries out certain inventive aspects of the present invention.

When launched, the user device control 160 provides a user interface 700 on a display of the user electronic device via which the user can utilize aspects of the present invention. The user interface 700 comprises a plurality of screens, as depicted in FIGS. 7A-7J, each of which provide a user with access to aspects of the present invention. When launched, the user device control 160 provides the user interface 700A depicted in FIG. 7A as a home screen via which a user can either select login (returning user) 702 or register (first-time user) 704. A first-time user must select register 704, and will then be prompted to enter a unique Company Code 706 via the user interface 700B depicted in FIG. 7B. That information is transmitted to the server 130, which creates an account for the user if the information entered by the user matches information in the licensing and configuration data 134c. To validate the new user, the server 130 transmits an email with a temporary PIN to the user email address, which queries the user to verify the mail by return response that includes the temporary PIN and the permanent PIN. If the email address, temporary PIN and permanent PIN match data on the server 130, the new user account is validated. Alternatively, a company my permit self-validation by empowering the administrator to indicate which of the users attempting to register are authorized users. If this is enabled, an administration will have access to a list of users attempting to register, and can indicate (by check-box, for example) which users are authorized—this exchange occurring between the server 130 and administrator, with the information regarding validated users being captured and stored by the server 130.

Figure 7A:
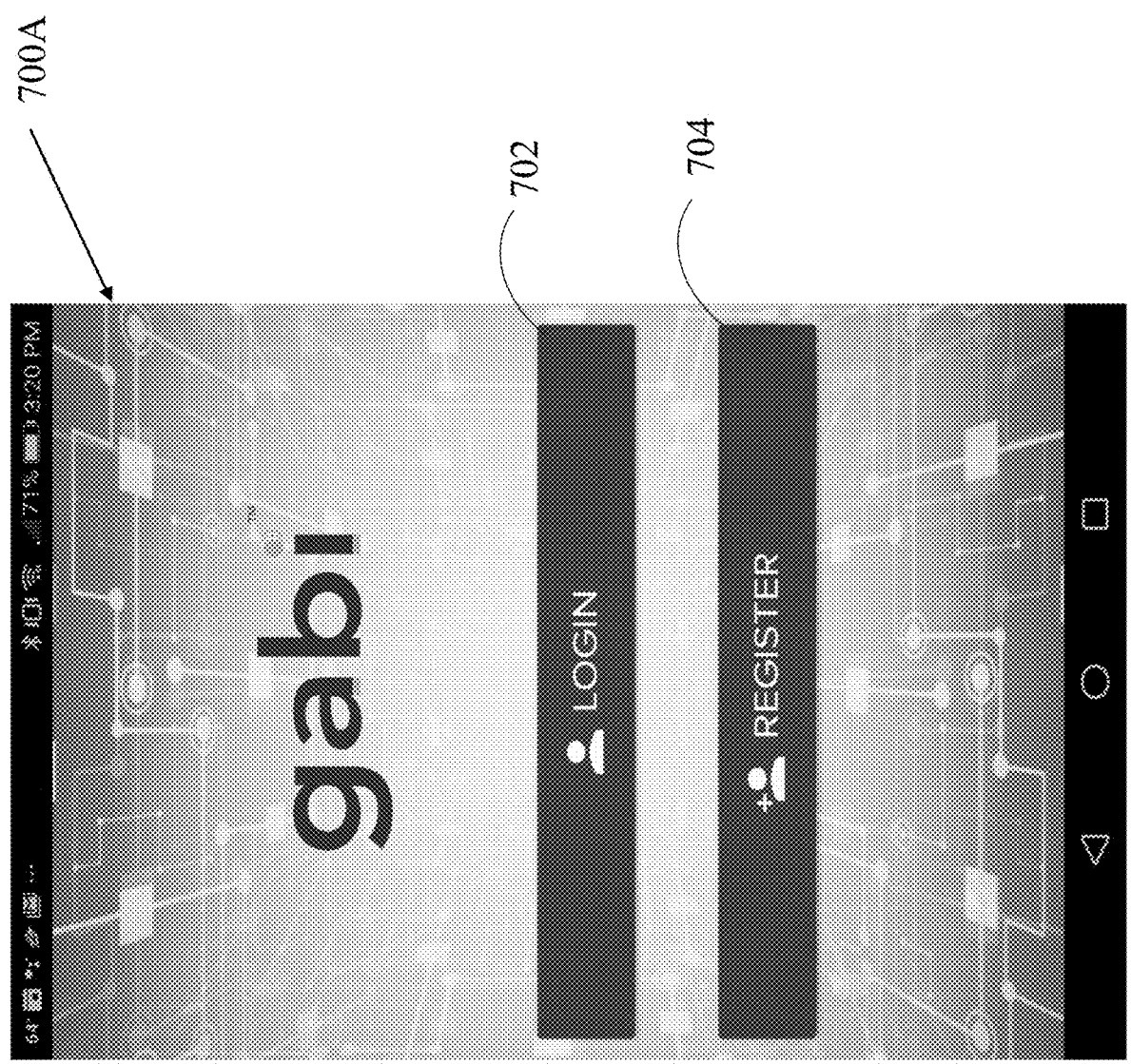
FIGS. 7A-7J depict screen shots of interfaces provided by a user device control on a user device in accordance with embodiments of the present invention.
Figure 7B:
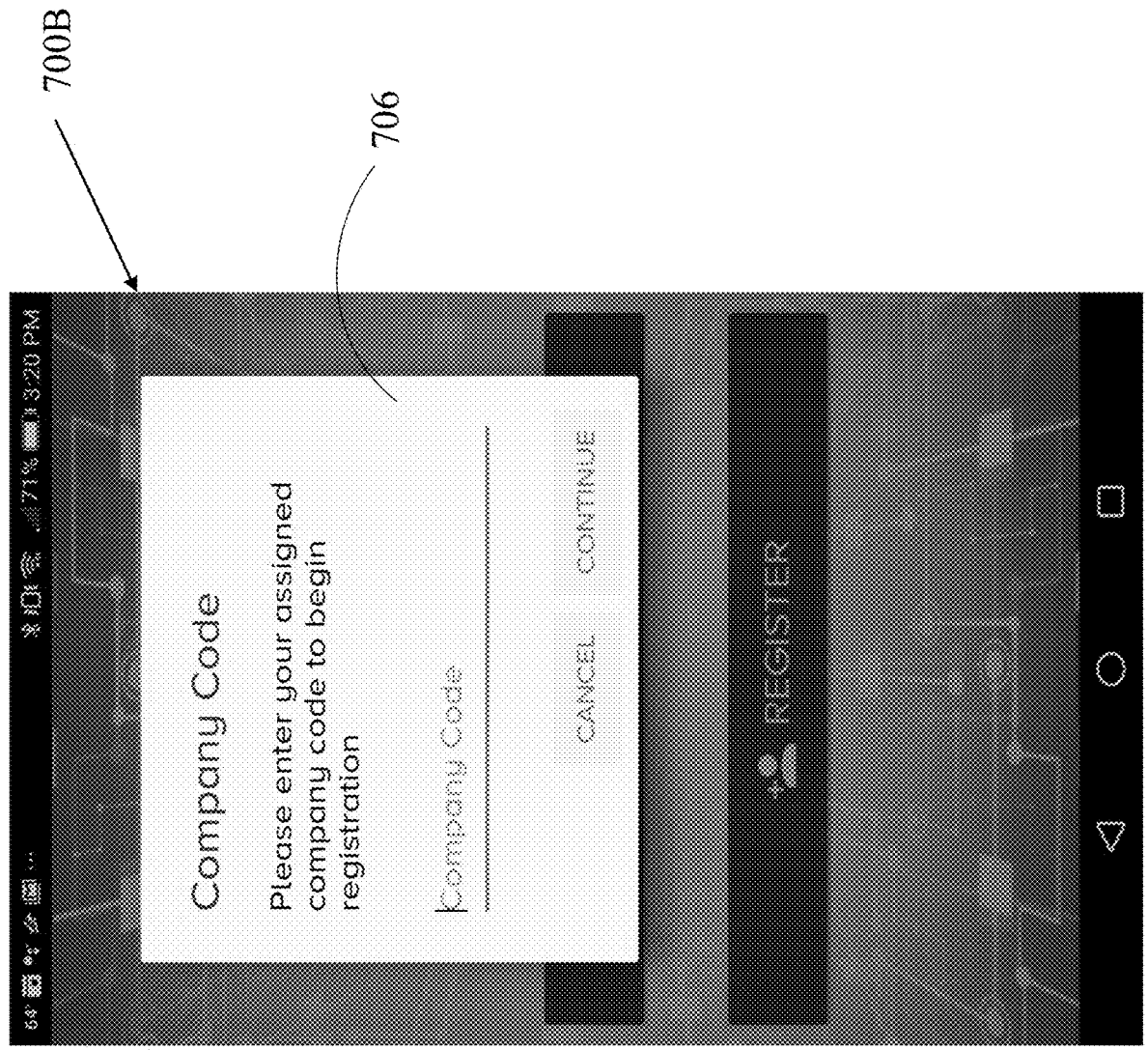
Figure 7C:
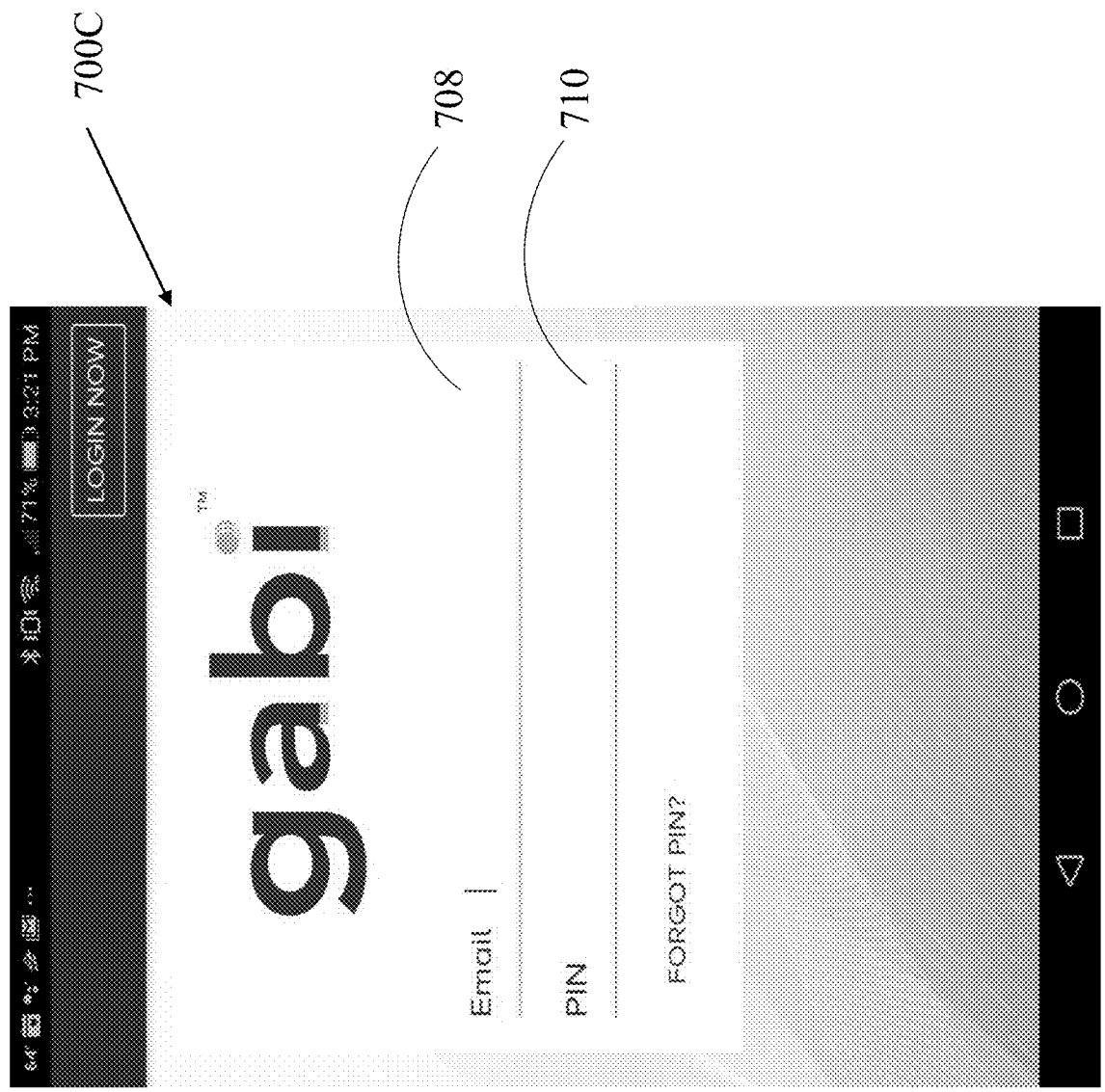
Figure 7D:
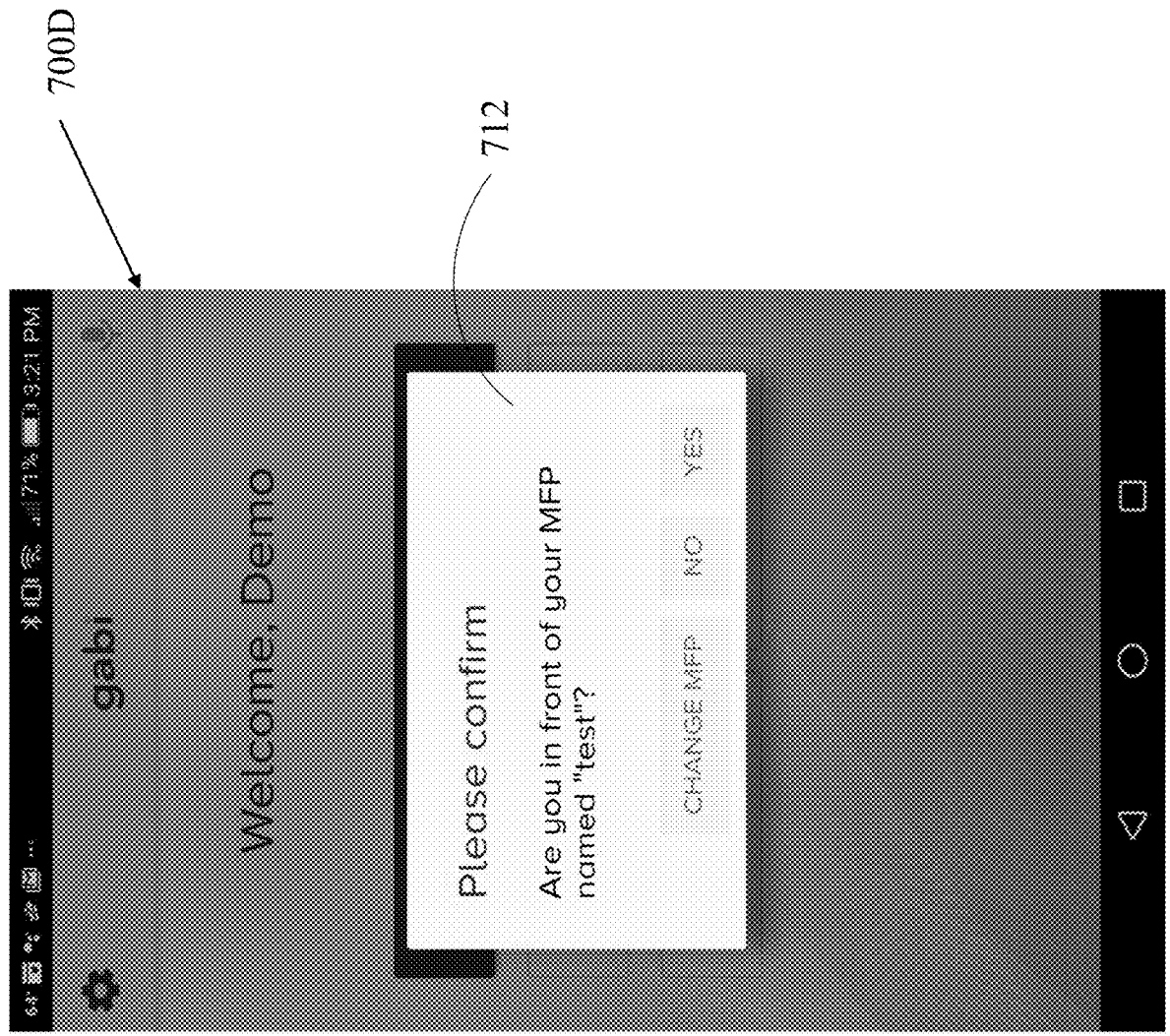

Returning users who select Login 702 on the user interface 700A of FIG. 7A are next presented with the user interface 700C depicted in FIG. 7C, and prompted to enter an email address 708 and PIN 710. Once logged in, a user will be prompted as to whether that user is proximate the target electronic device, i.e., the multi-function printer, as depicted in FIG. 7D, in which the user interface 700D present a prompt 712 to the user. The user's login name and permanent PIN were previously stored on the user electronic device 20 in a secure memory location only accessible with biometric information from the user, e.g., a fingerprint read by the user electronic device 20. The present invention prevents unauthorized access to the target electronic device 30 or other aspects of the present invention without biometric authentication, when that functionality is not native to the target device 30.

Figure 7E:
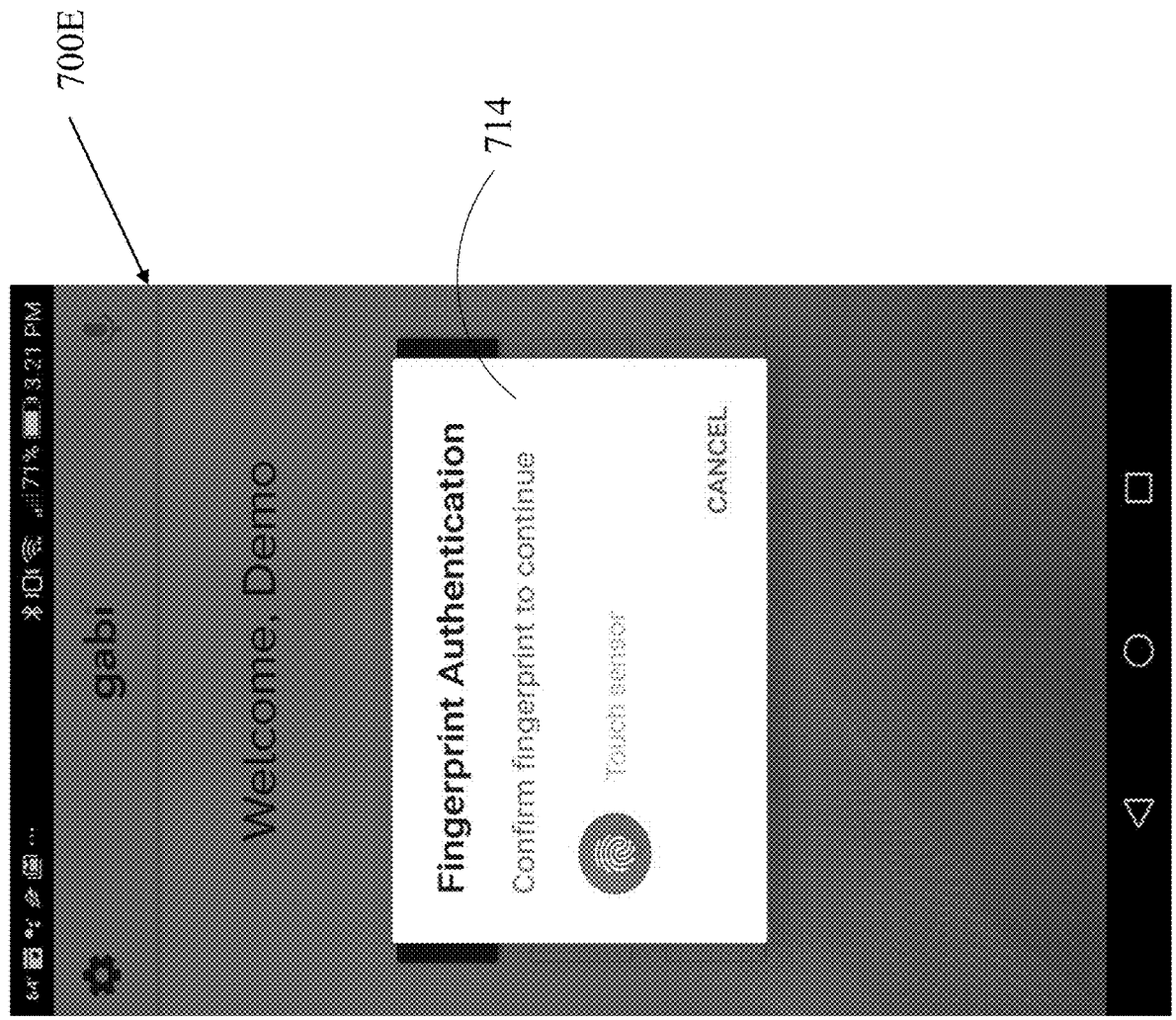
Figure 7F:
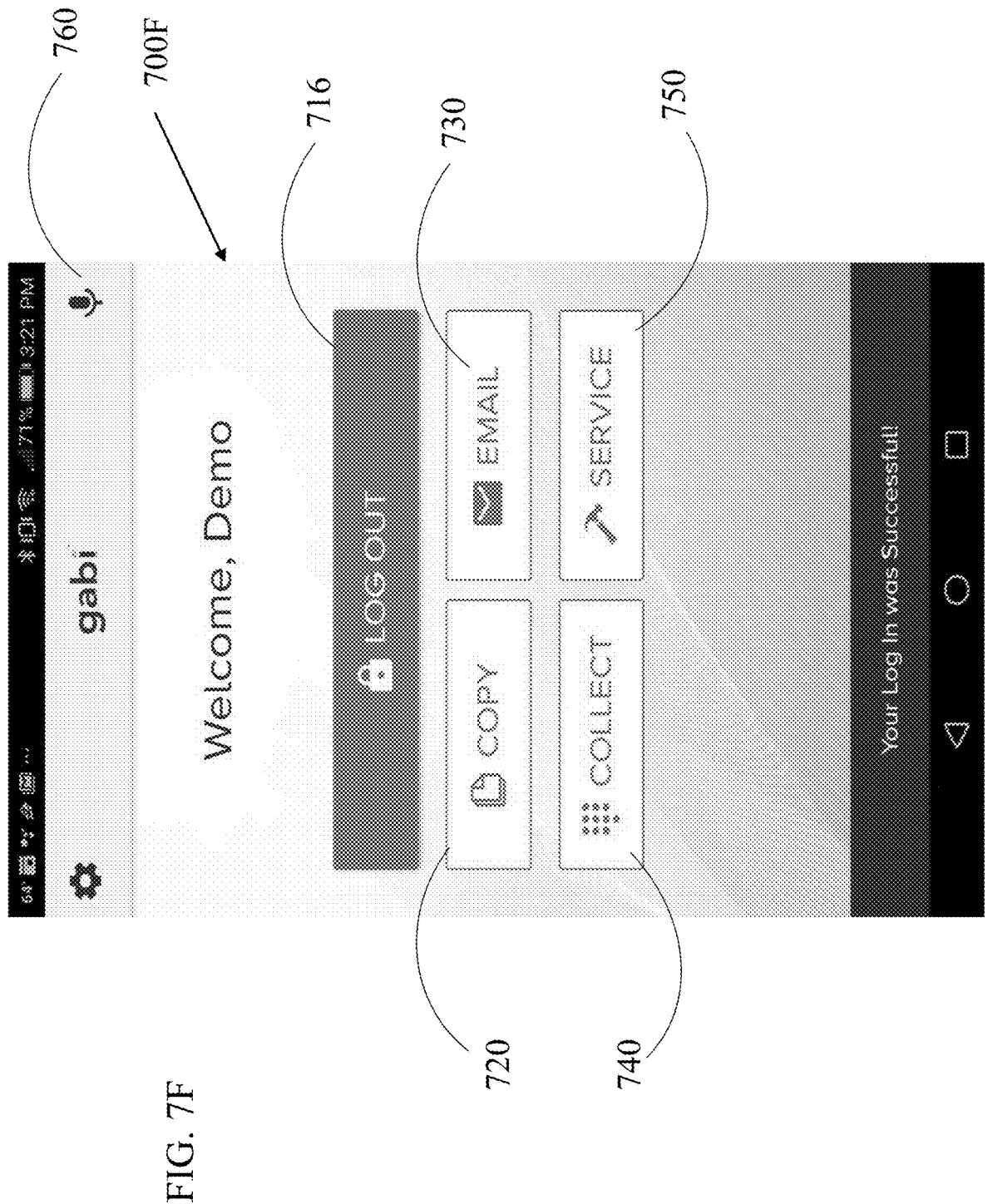

Two-factor, biometric authentication may be selectively required by, for example, fingerprint authentication 714, in which case the user interface 700E depicted in FIG. 7E will be provided by the user device control 160. This aspect of the present invention leverages certain functionality native to the user electronic device 20 that may not be native to the target electronic device 30 to cause that device 30 to carry-out or utilize the native functionality. In this case, the user electronic device 20 is capable of carrying out two-factor authentication using biometric data as one factor, and embodiments of the present invention enable that function to be used in connection with the target electronic device 30. As depicted in FIG. 7F, user interface 700E prompt the user to a biometric authentication—a finger print in this example—via a touch sensor fingerprint authentication 714.

Voice recognition functionality may be provided by embodiments of the present invention through interaction between one or more of an audio interface 170 of the user electronic device 20, a separate audio interface 170 proximate an electronic device 30, and a voice recognition server 150 such as, by way of non-limiting example, IBM Watson. This enables a user to carry out certain aspects of the present invention using audible commands. In an embodiment of the present invention, a voice signature for the user may be stored in the user account file 134e or otherwise in memory of the server 130 or a web server 150 capable of voice recognition. The verbal command entered by the user though the user device control 160 (via the audio interface 170) is captured (at least temporarily) thereby enabling comparison of the user's voice with the voice signature for that user previously stored. A user invokes this functionality with voice command captured or received by an audio interface 170 such as a speaker/microphone on the user electronic device 20 (see, e.g., FIG. 1), or a stand-alone speaker microphone, and voice activation interface 760 of the user device control 160 in FIG. 7F. Regardless of which audio capture/reception device is used, receipt or detection of a specific wake-up word or phrase causes the voice recognition aspect of the present invention to change from an inactive or passive state, where audio is received by the audio interface 170, but no action is invoked in response thereto, to an active state, where audio is received by the audio interface 170 and causes the smart box 110 to react according to the content of the received audio. Thus, the audio interface 170 and voice recognition aspects of the present invention do not capture all audio within range of the audio interface 170, but only audio that is preceded by the specific word or phrase.

After successful authentication, the user can access and utilize the present invention through user interface 700F depicted in FIG. 7F, which provides the user with a plurality of functions the user may select to access and control an electronic device 30. In one embodiment, these functions include, by way of non-limiting example, copy function 720, email function 730, collect function 740 and service function 750. The user can also use voice activation 760 to carry-out aspects of the present invention, or log out 716. Bach of these functions maps to API commands within the user device control 160, and to the smart box 110 which, in turn, accesses and controls a target electronic device 30 to enable that device to perform or respond to the selected function. This aspect of the present invention leverages certain functionality native to the user electronic device 20 that may not be native to the target electronic device 30 to cause that device 30 to carry-out or utilize the native functionality. In this case, the user electronic device 20 is capable of responding to audible commands, and embodiments of the present invention enable that function to be used in connection with the target electronic device 30, when that functionality is not native to the target device 30.

Operation and operational aspects of the present invention will now be described, with continued reference to the drawings. The present invention is addable to existing private networks 12 and public networks 10 without significant changes to either. As an initial step, the smart box 110 is pre-programmed for use in a specific network and network configuration, and to know the credentials of electronic devices 30 in its network. Parameters for pre-programming the smart box 110 may be provided, at least in part, by a person or entity involved with the configuration, setup and operation of aspects of the present invention. For example, pre-programming parameters may include, by way of non-limiting example, IP addresses of each electronic device 30 in the network to be accessed and controlled by the present invention. This information may be saved as a licensing and configuration data 134c in a data file 134 in data storage 136 of the server 130, and may also be associated with a unique company code that maps a smart box 110 to the licensing and configuration data 134c. The smart box 110 may initially be programmed with an API key that includes a license ID and machine key unique to the smart box 110. When the smart box 110 is initially connected to the private or public network, 12, 10, the smart box 110 communicates the API key to the server 130 as a user name or login ID and password. The server 130 identifies the data file 134 for this smart box 110, and returns the licensing and configuration data 134c to the smart box 110. Once a smart box 110 has successfully logged into the server 130 (as just described), the server 130 sends an email, text, or other communication to a destination previously identified when programming parameters were provided about the smart box 110. Typically, this would be an email address of a system administrator. In that email address a hyper-link is provided that, when selected by the administrator, connects the administrator to the smart box 110 as a console, providing the administrator with access to certain control functions for the smart box 110 and its configuration. For example, once connected as console, the administrator will have access to a pull-down menu on which each electronic device 30 that is accessible and controllable using the present invention is identified. To enable access and control of each device 30 by the smart box 110 and user device control 160, the administrator provides super-user credentials for each electronic device 30. This enables the smart box 110 and user device control 160 to access a target electronic device 30 as a super-user (i.e., as an administrator, service, tech, manufacturer, etc.) and gain access to data captured and stored by/on the electronic device 30.

Once the smart box 110 is brought online (as described above) and the electronic devices 30 and documents 156 in its network 12 or 10 are accessible and controllable, the smart box 110 sits in an idle state until a user, using the user device control 160, chooses to initiate a transaction to utilize aspects of the present invention. This begins a process through which the electronic device 30 changes from a closed state to on open state for this specific user. Because access to and control of a smart box 110 is user-centric, so too is control of electronic devices 30 and documents 156. Thus, one user's access to and control of a smart box 110 does not impact any other user's access and control. If a user is denied access to an electronic device 30 or document 156, that does not impact any other user's access to the same electronic device 30 or document 156. Notwithstanding the foregoing, the smart box 110 is able to communicate with the server 130 and receive configuration updates from the server 130, as depicted in the flow diagram of FIG. 4.

In the case of voice activation interface 760, the smart box 110 will access a voice recognition service to receive, analyze, and parse the voice commend, and to return a response to the smart box 110 that is then in a format that is transmittable to and understandable by an electronic device 30, and that can cause or enable the electronic device 30 to perform the requested function. Referring again to FIG. 1, a voice command spoken by a user into the user's electronic device 20 is transmitted by the user device control 160 to the smart box 110, which identifies the command as a voice command, and transmits it via a secure connection to a voice recognition server 150, such as IBM Watson or Amazon Web Services ("AWS") platform. Communication between smart box 110 and voice recognition server 150 is preferably carried out using a Transport Layer Security (TLS) 1.2 protocol. Voice recognition may alternatively be implemented in a variety of other ways, including by means of the server 130 and data storage 136 in combination with an associated smart box 110, or by another specialized server and data storage.

As illustrated again with reference again to FIG. 1, special purpose software in the form of an API 152 may be provided on the voice recognition server 150, and be configured with speech to text, NLP, and text to speech capabilities. The voice recognition server 150 returns text commands to the smart box 110, for transmission thereby to the target electronic device 30.

Figure 7G:
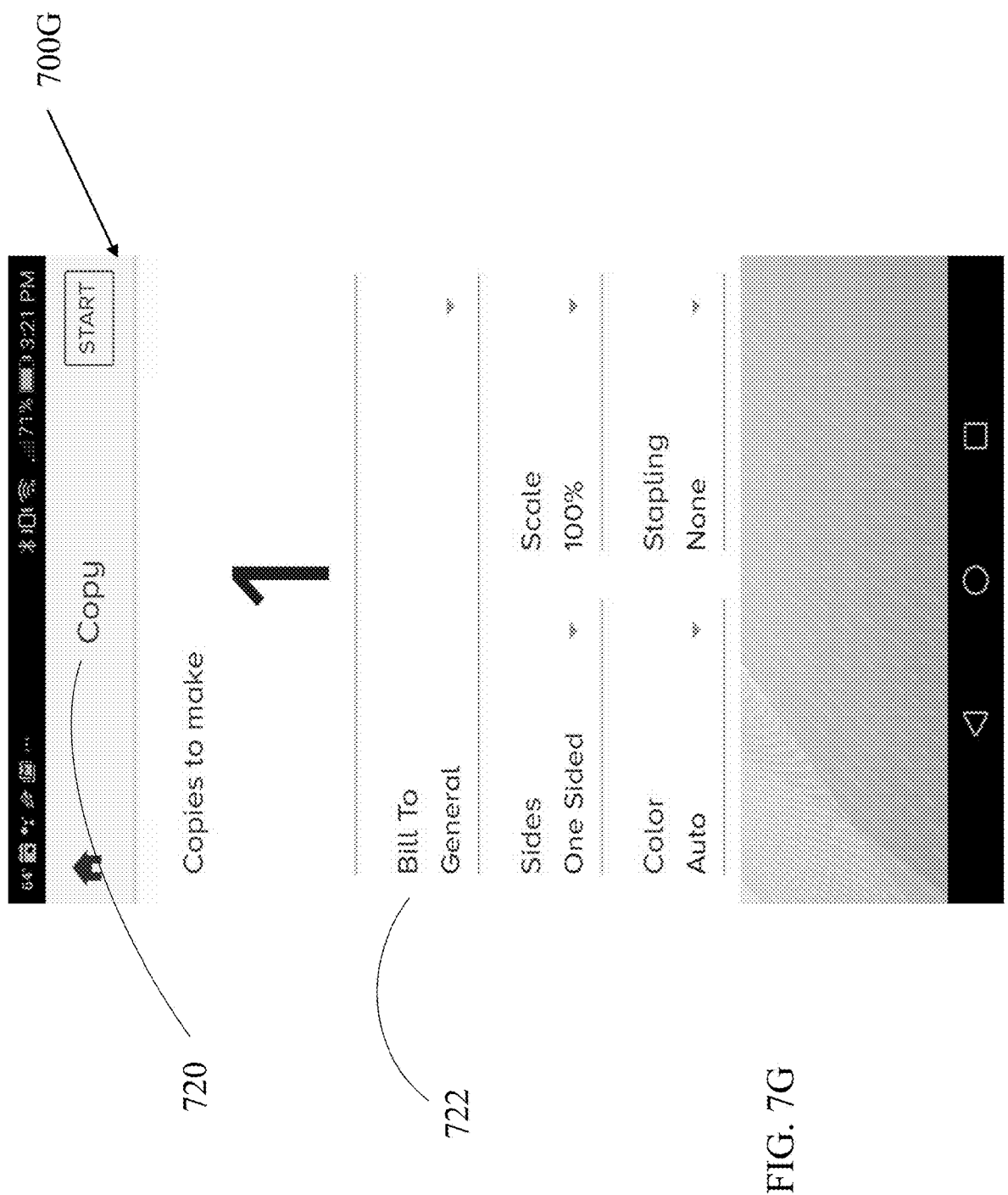

In operation, a user can access the copy function of the present invention via the user interface 700F depicted in FIG. 7F, and by selecting Copy 720, after which the user is presented with the user interface 700G depicted in FIG. 7G. Via this user interface 700G the user can control the target electronic device 30 and cause it to carry out various transactions associated with using that device 30 for copying a document.

In operation, a user can access the email function of the present invention via the user interface 700F depicted in FIG. 7F, and by selecting Email 730. The user device control 160 then presents the user interface 700H depicted in FIG. 7H, enabling a user to use the present invention to cause a target electronic device 30, an MFP in this case, to send an email to a recipient selected by the user without access to the email list of the MFP. The present invention thus accesses data and information native to the user electronic device 20 or particular to the user, in this case, the user's email address book 736. This enables the user to cause the target electronic device 30 to send an email to a recipient that is not known to that device 30. Thus, the present invention enables a user to access and control an MFP to cause that MFP to carry out a function different than the functions it is configured to carry out. In addition, the present invention further uses native technology of the user electronic device 20 to leverage already existing connections and permissions (e.g., login details) to facilitate access to documents, services, applications, etc., for various types of user accounts. For example, a user need not enter login credentials for access to files stored in a DROPBOX account in order to access these files for use by the present invention, in effect enabling the target electronic device 30 to access these files without requiring the user's login credentials.

As the universal controller, the smart box 110 also has the ability to determine whether a user is violating a predefined rule or attempting to initiate a transaction that would be considered an anomaly. For example, for enterprise applications, email rules may be defined regarding permitted and/or restricted email addresses. That information may be stored in a data file 134 on the server 130, in memory on the smart box 110, or both. When a user invokes the email function and attempts to email using the email user interface 700H of FIG. 7H, the smart box 110 and/or server 130 can compare the email recipient against a white-list of permitted recipients, or a black-list of restricted recipients, to determine if the email should be sent.

Figure 7H:
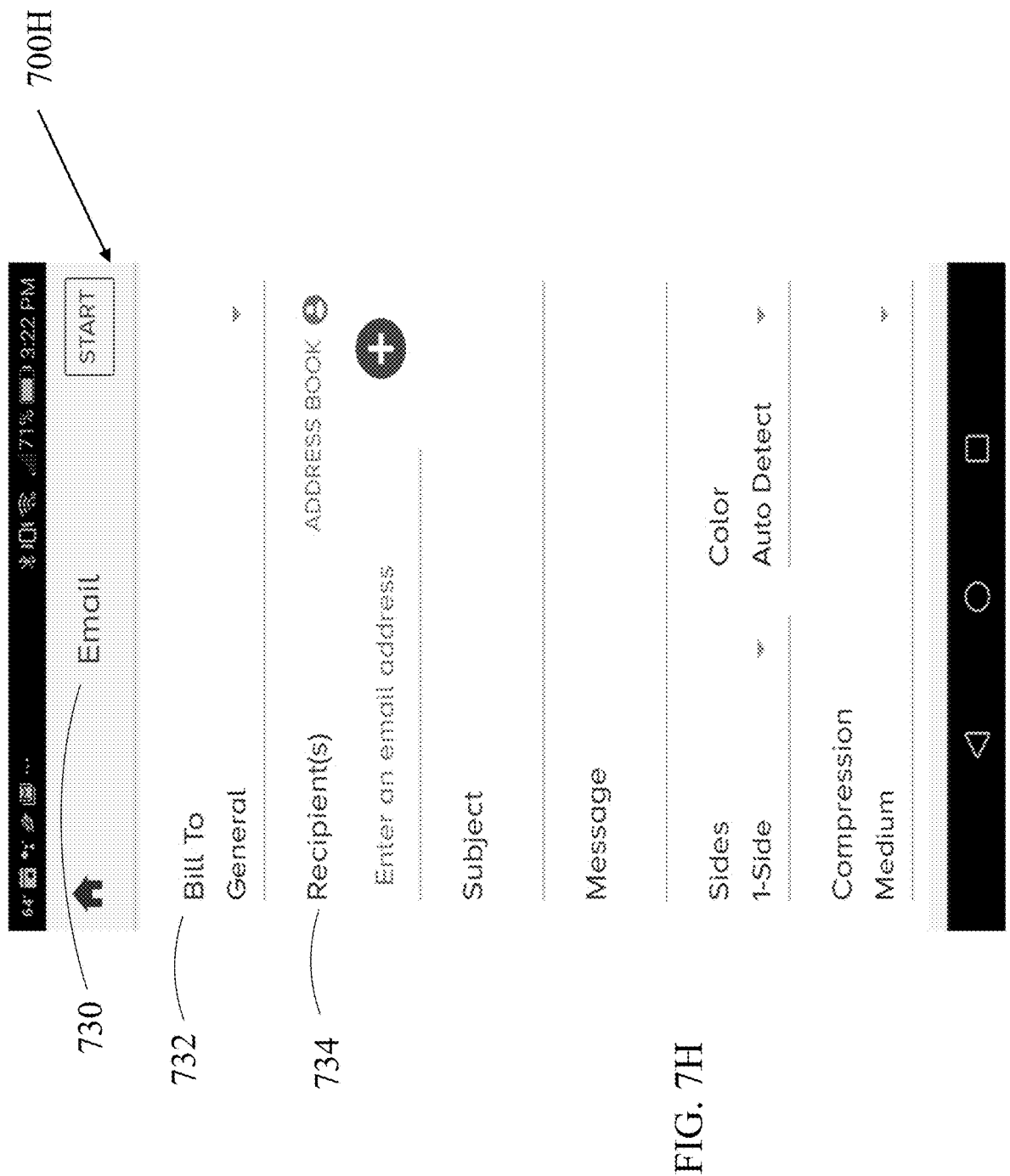
Figure 7I:
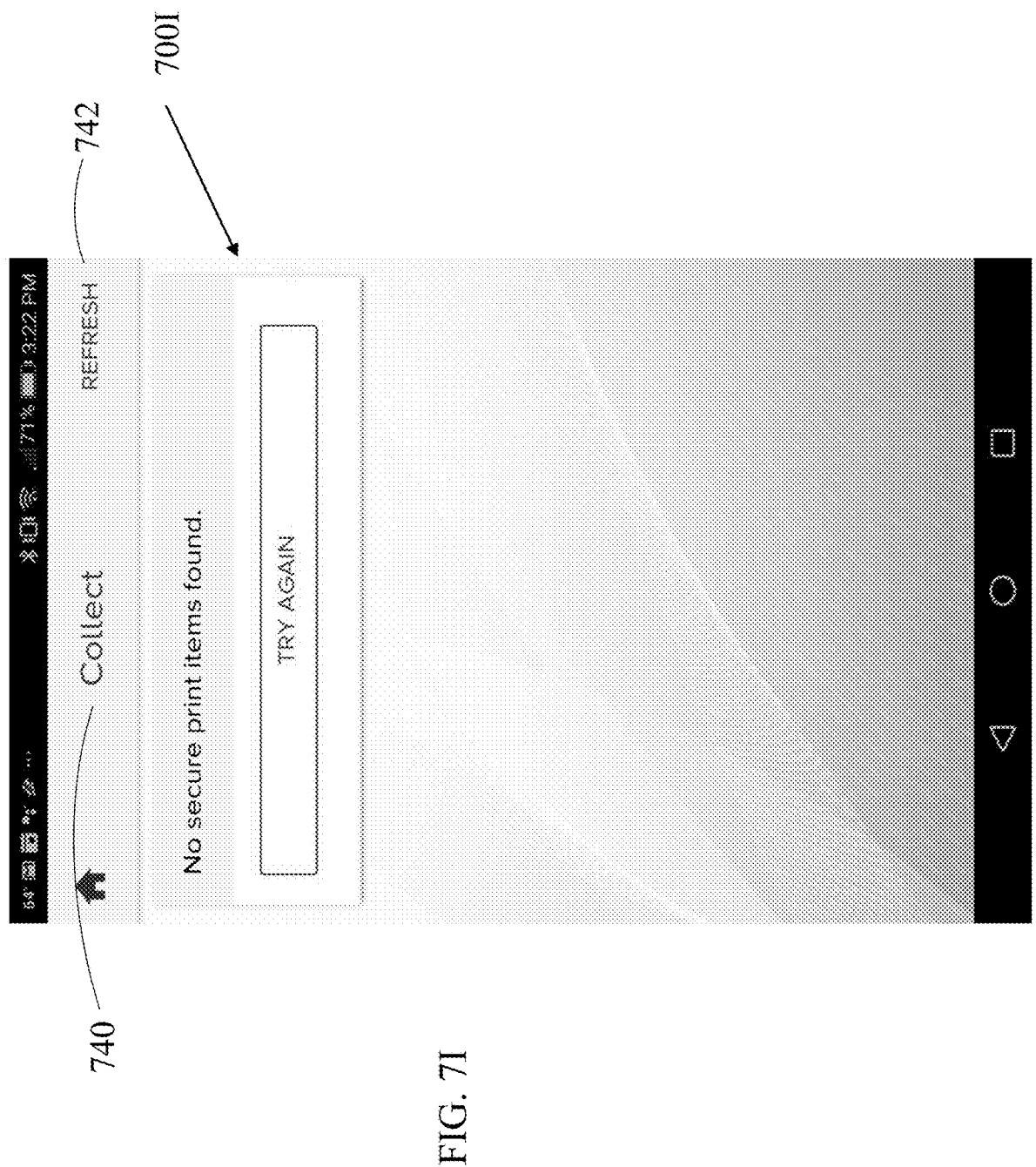

In operation, a user can access the collect function of the present invention via the user interface 700F depicted in FIG. 7F, and by selecting Collect 740, which provides user interface 700I depicted in FIG. 7I. This function enables a user to collect secure documents at the target electronic device 30, in this case the MFP, that can only be printed by the user.

Figure 7J:
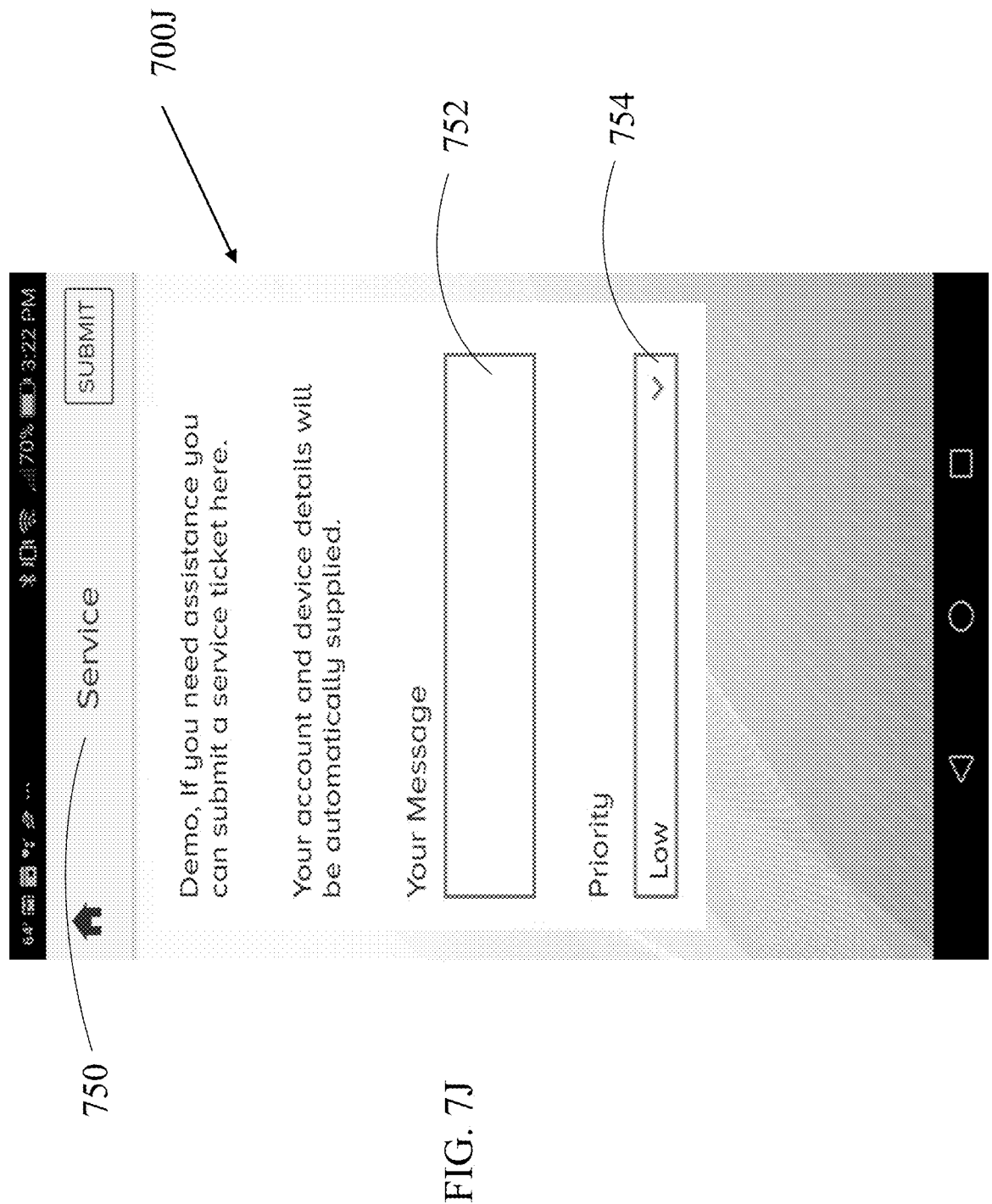

The user interface 700J for user access to the service function 750 is depicted in FIG. 7J. Via this interface 700 the user can submit service calls for the electronic device 30 by entering a message 752 and indicating a priority level 754. This information is transmitted by the user device control 160 via the API to the smart box 110, which, in turn transmits the service call to the server 130. The server 130 access the service ticket data 134d database to determine the contact rules for service tickets for the subject electronic device 30, and transmits the service call to the recipient identified in the service ticket data 134d database for the subject device 30.

Any of the afore-discussed functions may also be accessed using voice recognition via the user interface 700F depicted in FIG. 7F, and selecting the microphone 760.

In some cases, the functions available to the user via the user interface 700 provide access to further functions. For example, copy 720 and email 730 functions may provide an option to charge a client or customer for use of the electronic device 30. It is typical for law firms and accounting forms, for example, to charge clients for copies. In such cases, a code must be entered designating the correct charge-to entity before the electronic device 30 can be used. The present invention enables a user to access one or more databases of such codes located on the server 130, a remote server or other data storage device that is not connected to and may not be in the same network as the electronic device 30 being accessed and controlled. The user interface 700G for the copy 720 function is depicted in FIG. 7G, and includes a "Bill To" pull-down menu 722 which provides the user with access to a database of client codes selectable by the user to designate a client to charge for use of the electronic device 30. The client codes accessible to the user via the pull-down menu have been previously mapped to the users account, thus providing limited and user-specific information.

Similarly, the user interface 700H for the email 730 function is depicted in FIG. 7H, and includes a "Bill To" pull-down menu 732 which provides the user with access to a database of client codes selectable by the user to designate a client to charge for use of the electronic device 30. This user interface 700H also includes a "Recipient" field 734 that can be populated with one or more email addresses selected from the user's contacts. While an MFP can be configured and used to send email, it is limited to the contacts programmed into the MFP. With the present invention, the email function of an MFP is accessed and controlled in a way that enables the user to send emails from the MFP to recipients in the user's contact list, or from a contact list that is not known by the MFP or other electronic device 30.

Another embodiment of the present invention provides the ability to intelligently manage one or more target electronic devices 30. As noted, the smart box 110 has super-user access to data collected and stored by an electronic device 30. Such data provides a variety of useful information about usage of the electronic device 30 such as, for example, which paper trays are used most often, time-based use of the device 30, and other use and operational characteristics and data of the device 30. In accordance with embodiments of the present invention, the smart box 110, having access to this data, may use this data to intelligently control use of the electronic device 30. For example, if an MFP has a plurality of paper trays configured for the same size paper, with one tray being a default tray, that tray is likely to be used more often than the others. As a result, parts of that tray are exposal to more use than parts of the other trays. Knowing this, the present invention can direct print, copy, etc., commands to effect a more uniform use of the target electronic device 30. This will result in greater longevity for the parts of the electronic device 30, and a reduction in service calls and repairs.

The present invention can also be used to automate certain service conditions for a target electronic device 30. For a type of device, like an MFP. There may be a finite set of problems that occur with the greatest frequency. Once this set of problems is identified, the smart box 110 can be configured to automatically detect the occurrence of such a problem at a target electronic device 30 and automatically create a service call without the need for user involvement.

A licensing and data configuration file 134c may contain information specific to this user, including rules that define authorized and unauthorized features this user is permitted to access, and other rules defining permissible use by this use of the electronic device 30. It is thus possible for the smart box 110 to initially flag a transaction from a user, and to communicate with the server 130 to determine whether the transaction violates a rule for that user. Information about user permissions may also be contained in a user account file 134e. Server 130 may, for example, be configured as an artificial intelligence-based analysis engine capable of analyzing a risk level associated with the transaction based on data gathered by a smart box 110 for similar transactions made on the electronic device 30 as well as other similar electronic devices 30 (e.g., electronic devices 30 in the same private network 12). The server 130 can thus determine whether the transaction is an anomaly or an exception, and if so, whether the exception has been or can be resolved. As noted, the smart box 110 functions as a universal controller, controlling user access to and use of electronic devices 30 and electronic documents 156. When a request for a transaction is received by the smart box 110, it can determine if the transaction is an exception or anomaly that is out of compliance with rules for the user. This can be by the smart box 110 alone, or together with the server 130. From the information in the data storage 136 specific to this user, e.g., in cither or both 134c and 134e files, and based upon the transaction request transmitted by the user device control 160, the server 130 may transmit information back to the smart box 110 providing a disposition command with respect to the requested transaction, e.g., indicating that the transaction has been executed or not.

In assessing a transaction and determining whether it's an exception or there is a risk, server 130 will consider past experience with the requesting user, the electronic device 30, and other similar electronic devices 30, as well as other pertinent information that may be available to the server 130 (for example, suspect production request patterns reported by other document production centers), the server 130 may prepare a request disposition and transfer this information to the smart box 110 to guide the response Of the smart box 110 to the document production request. For example, the response disposition may authorize the smart box 110 to instruct the electronic device 30 to proceed to fulfill the document request in its entirety ("green light").

Alternatively, if the server 130 concludes that there is some risk associated with the document request or finds that the request will exceed document production features and permissions either for the user or the type of transaction (for example, excessively-high page counts), the request disposition may instruct the smart box 110 to provide altered instructions to the document processing device ("yellow light"). For example, the request disposition may instruct the smart box 110 to diminish the requested number of copies or rate of printing of copies as would be expected in response to the production request. Alternatively, the smart box 110 may be instructed to forward the document request to another smart box 110 associated with an electronic device 30 that, for example, has been reserved and isolated for production requests identified as presenting some risk.

Finally, if the server 130 concludes that the production request presents a significant risk or is well outside the limits of associated production features and permissions, the request disposition may call for the rejection of the production request ("red light"). If the product request is at least partially executed, the smart box 110 may preferably collect execution information from the electronic device 30 providing details about the execution and/or information about the current state and resources available to the electronic device 30. In any case, the electronic device 30 or electronic document 156 are still available to other users regardless of whether a transaction request by a particular user is denied.

In accordance with another embodiment of the present invention, a system and method for securely accessing, manipulating and controlling electronic devices or electronic documents uses multi-factor, biometric authentication and blockchain technology. In some respects, embodiments of the present invention increase access to electronic devices and documents. For example, a MFP may have stored in local memory documents containing sensitive information, e.g., confidential client information for attorneys, personal health information for medical professionals, and other types of information intended for restricted access. Cloud-based computing enables the remote storage of and access to documents, data, information, etc. For example, cloud storage repositories such as DROP BOX, GOOGLE DRIVE, MICROSOFT AZURE, AMAZON DRIVE, and others provide data storage over the Internet that is delivered on demand with just-in-time capacity and costs, thus eliminating the need for an individual or enterprise to buy and manage its own data storage infrastructure. This provides agility, global scale and durability, and anytime, anywhere data access. It thus is important that embodiments of the present invention provide adequate and suitable controls for protecting such types of information from unauthorized access and use. To this end, the present invention provides embodiments that accomplish this differently. In accordance with an embodiment, blockchain technology is used to ensure that a user is an authenticated user, and should be accessing the electronic device(s), documents, information, data, etc. made possible with aspects of the present invention. In accordance with another embodiment, voice authentication is used, either alone or in connection with blockchain technology, to ensure that a user is an authenticated user. In yet another embodiment, one or more monitor bots are deployed to monitor usage of electronic devices accessed by and/or with the present invention to ensure that such access is within a normal or expected type of usage (e.g., not too many copies, not at off-hours, not activating Wi-Fi, etc.). Any detected usage that is not is flagged as an anomaly and subject to intervention and further authentication before a requested transaction may be allowed.

Figure 8:
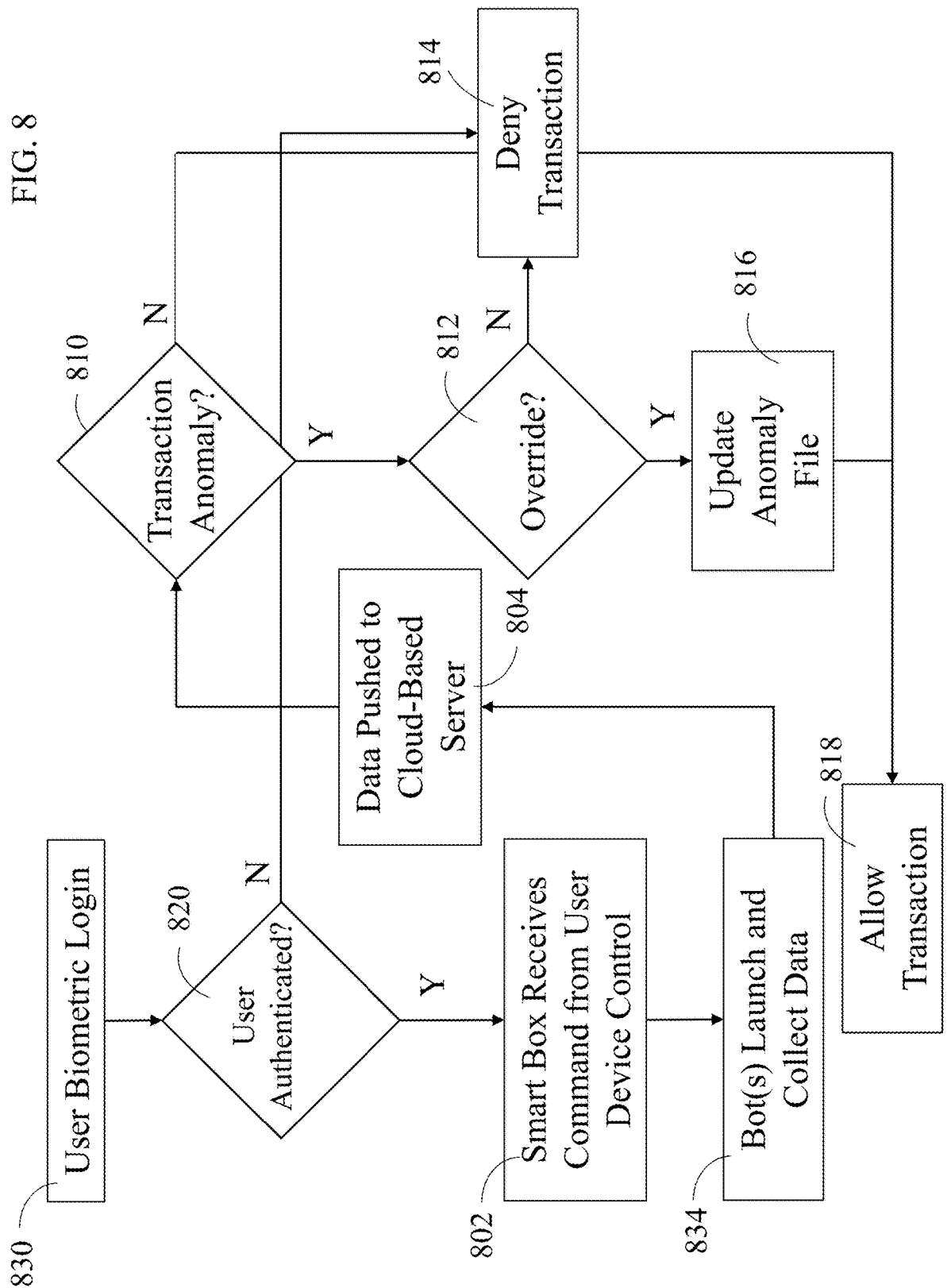
FIG. 8 is a flow diagram depicting a method for providing security for an electronic device in accordance with embodiments of the present invention.

Referring next to FIG. 8, and with additional reference to FIGS. 1, 9, 10 and 11, a system and method for securely accessing, manipulating and controlling documents and devices using natural language processing in accordance with an embodiment of the present invention will be discussed in greater detail. The present invention uses biometric authentication together with blockchain technology and one or more monitor bots to provide the inventive system and method. An inventive aspect of the present invention is applicants' combination of biometric authentication as a building block of a sentinel aspect of the present invention—providing for secure access—and the use of blockchain technology and one or more monitor bots to enable the secure access and secure manipulation and control of documents and devices. Access to a device or document is not possible with the present invention without a user first providing biometric data, and without that biometric data being validated. Applicants' use of blockchain technology for aspects of the present invention can be carried out using any known or hereafter developed blockchain methods, systems, technology, as that aspect of the present invention does not reply upon a specific or particular implementation of blockchain technology. With one or more monitor bots, applicants' invention provides predictive artificial intelligence, as the bots can provide user-centric, process-centric and/or transition-centric monitoring and identification of anomalous circumstances, events, transactions, commends, etc., which can result in creation of an exception that would enable the same circumstance, event, etc. to not be identified as an anomaly for subsequent occurrences. This aspect of the present invention is directed, at least in part, to providing secure access to documents and devices.

As a first step, the present invention requires biometric authentication before a user will be provided with access to a device or document. Biometric authentication may be by one or more of fingerprint via a user electronic device 20, voice recognition via a user electronic device 20 using an integral or separate audio interface 170. With reference to FIG. 8, a user may login to access a device or document using the user electronic device 20 and a biometric ratty device through an interface provided by the user device control 160, at step 830. If a user is not authenticated, as determined at step 820, the transaction is denied at step 814. Once a user is authenticated, the user can now transmit to the smart box 110 a command for a transaction to control the device 30 or access a document 156 in a document repository 154. In the case of access to an electronic device 30, the status of the device 30 changes from closed to open, indicating that the user has been authenticated and may now present or transmit commands for a transaction to control the device, at step 802. However, whether the transactions are carried-out by the electronic device 30 will depend, at least in part, upon whether the requested transaction is an anomaly, as described further herein.

Present and operational on the smart box 110 are one or more monitor bots 180 that may be separately configured to monitor users, processes, and/or transactions, and that may automatically launch when a user has been authenticated and when the electronic device status changes to open. For example, a monitor bot 180 may be configured to monitor users according to predefined criteria or parameters that define acceptable uses of the device, or access to the document by a particular user. The bots 180 may also be configured to identify when a user presents a command for a transaction that is not within the predefined criteria or parameters. Thus, and in this manner, although the status of an electronic device has changed from closed to open, the user still does not control the device until it is determined whether the user transaction is permissible.

At step 802 as illustrated in FIG. 8, the smart box 110 receives a command from the user device control 160 to access and control the electronic device 30 or document 156. Monitor bots 180 may be launched at step 834 based upon a user identification (i.e., user-centric), upon initiation of, or a request to initiation a process (i.e., process-centric), e.g., open Wi-Fi, or upon initiation of, or a request to initiate a transaction (i.e., transaction-centric), e.g., access to a device or document. One or more monitor tots 180 may gather information about the requested transaction, and push that information to a cloud-based API, at step 804, where logic is provided to determine whether the transaction request is an anomaly, at step 810, based upon certain predefined criteria. For example, the present invention may evaluate whether a transaction is an anomaly by comparing the transaction and its characteristics (e.g., type of transaction (e.g., print, copy, email, etc.), time, Size/quantity, user, etc.) with permissions defined in a user account file 134c for that user. If the transaction request is consistent with these permissions and, therefore, is not an anomaly, the transaction is allowed, as step 818.

In general, a transaction is an anomaly if it is out of the ordinary for a particular user. As an example, consider that user A works 9-5, Monday-Friday, and uses a MFP to print from 100-200 pages per week. If user A initiates a transaction on Sunday at 11 PM to a MFP to print 5,000 pages, that would be out of the ordinary and flagged as an anomaly. Other non-limiting examples of anomalies may include Wi-Fi access and control, email to non-approved recipients or domains, and document downloads to removable storage devices.

In accordance with embodiments of the present invention, a user account file 134e (see, e.g., FIG. 1) is created for each user that contains, inter alia, one or more permissions for that user that serve to define transactions that user is permitted to initiate. Such permissions may include, by way of non-limiting example, and times of day the user is permitted to initiate a transaction, type of transactions allowed (e.g., print, email, document download, etc., size/frequency of a transaction type, e.g., print jobs limited to not more than 500 pages per week).

Returning to FIG. 8, if the transaction is identified as an anomaly, at step 810, the present invention provides an override capability determined at step 812 by creating and transmitting a notification to a predetermined destination and recipient—typically a system administrator. Transmission of the notification may be by email, text, or other suitable communication means. The recipient has the authority and ability to override the anomaly, i.e., to allow the transaction to proceed, in which case the process proceeds to step 816 where the user account file 134e for the particular user may be updated so that the permission(s) contained therein now reflect that what was previously considered an anomaly should not thereafter be considered as such. A blockchain data set may also be employed and updated to reflect the outcome of the anomaly analysis.

Alternatively, the recipient of the notification can reject the transaction because of the anomaly, in which case the transaction is denial, at step 814. Still alternatively, an automatic override in at least some cases may permit a transaction to proceed when an anomaly is identified. For example, the user account file 134e may contain permissions that are defined by ranges of allowable values, e.g., user A typically prims on weekdays between the hours of 9:00 AM and 5:00 PM, but print jobs on weekdays at 6:00 PM are permissible. Finally, for a verified transaction that is not an anomaly or for which an anomaly is overridden, the transaction is allowed, at step 818.

As previously noted, the present invention may utilize blockchain technology as at least a part of the inventive solution to ensure that access to manipulation of, and control of a device or document is secure. For example, at step 816, when an anomaly has been identified, evaluated, and the transaction allowed, this outcome is captured in an update to a blockchain data set that may be defined for this user, this process, this transaction, or combinations and/or variations of the foregoing. There are various known ways to implement such functionality, and likely various to-be-developed ways, some or all of which may be suitable for carrying-out this aspect of the present invention. Thus, the disclosure provided herein regarding blockchain technology and its implementation in the present invention are illustrative, non-limiting examples. It being apparent to a person skilled in the art from this disclosure that variations of the present disclosure, and/or of known or hereafter developed blockchain technology implementations may be utilized for the present invention.

Importantly, the present invention is directed to avoid using user personal data or information in a blockchain data set. In certain applications of the present invention, personal information of a user may be accessed, obtained, or otherwise made available, e.g., personally identifiable information (PII), or sensitive personal information (SPI). To ensure that no such data is included in a blockchain data set, implementations of the present invention preferably create a link table that provides cross-reference between the user PII, SPI, etc. data, and data submitted to the blockchain data set.

Figure 9:
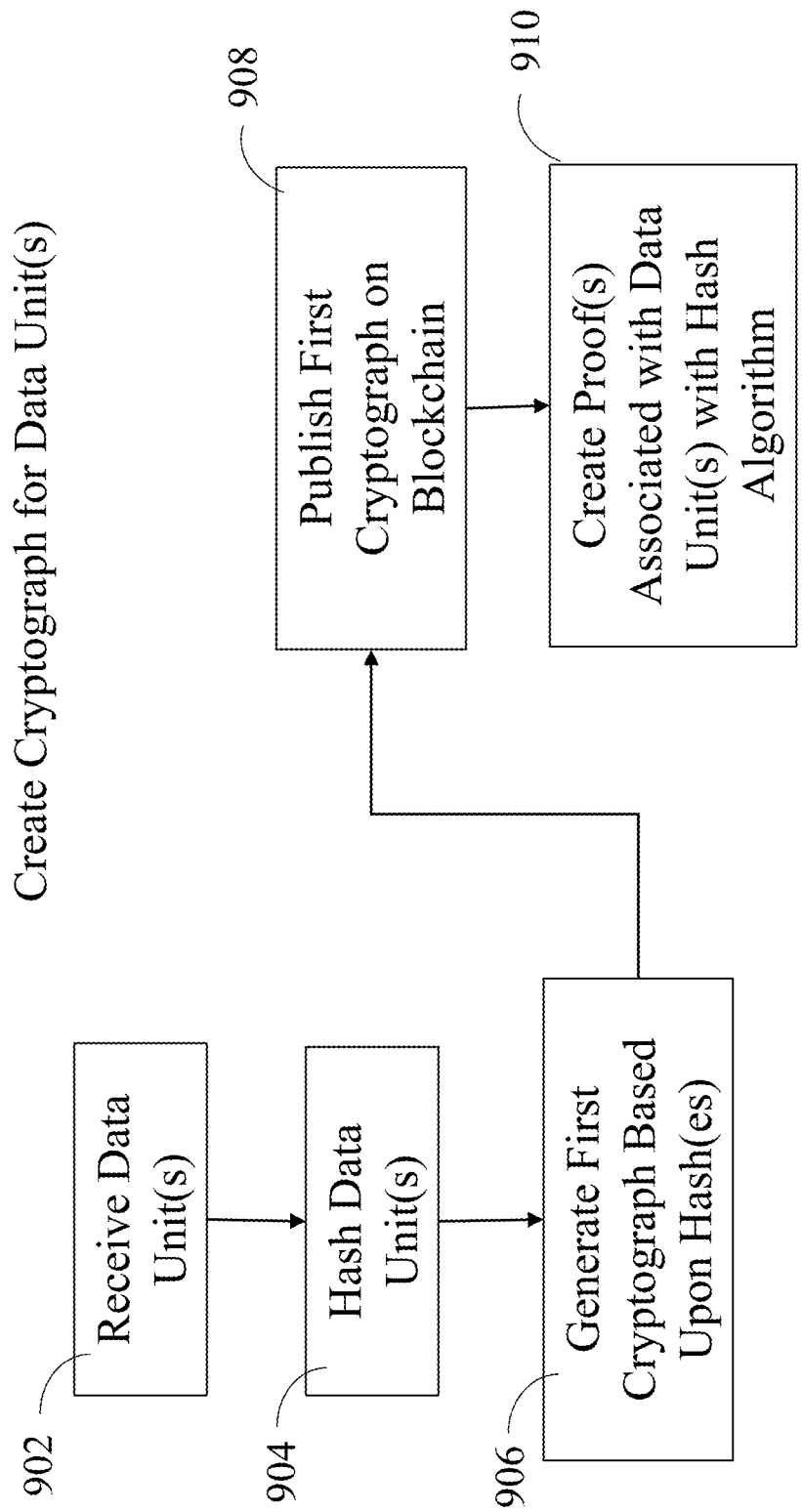
FIG. 9 is a flow diagram depicting a method for creating a cryptograph for a data unit in accordance with embodiments of the present invention.
Figure 11:
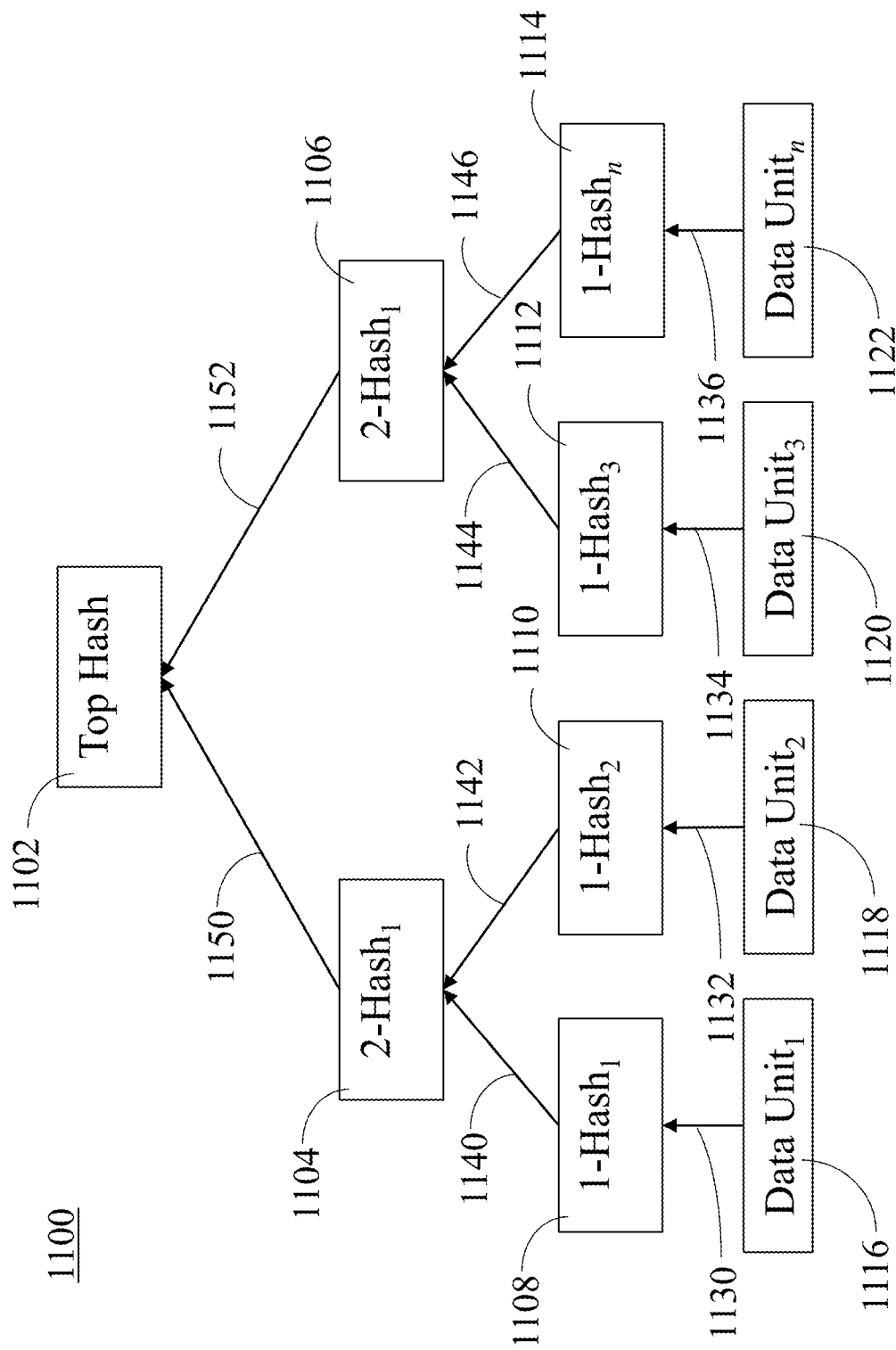
FIG. 11 depicts an illustrative, non-limiting cryptograph structure for use with embodiments of the present invention.

The following provides an illustrative, non-limiting example of a blockchain implementation that may be suitable for the present invention. Once a smart box 110 receives a command for the transaction from a user device control 160, step 802, blockchain technology may be used to verify the transaction. Referring next to FIG. 9, a process for creating a cryptographic structure (i.e., a cryptograph) is depicted. A server 130 as depicted for example in FIG. 1—preferably a cloud-based server—receives a data unit, at step 902 of FIG. 9, and hashes the data unit, at step 904, generating a first cryptograph based upon the hash, at step 906, publishing the first cryptograph on blockchain, at step 908, and creating a proof associated with the data unit using a hush algorithm, at step 910. A non-limiting cryptographic structure 1100 as produced by the process of FIG. 9 is depicted in FIG. 11. Cryptographic structure 1100 may be generated by server special purpose software 132 configured as a cryptographic structure module to create such a structure, as described below with reference to FIG. 12.

As shown in FIG. 11, data units 1116, 1118, 1120 and 1122 may be hashed (1130, 1132, 1134, 1136) to produce first hashes 1108, 1110, 1112 and 1114. First hash 1108 may correspond to data unit 1116, first hash 1110 to data unit 1118, first hash 1112 to data unit 1120, and first hash 1114 to data unit 1122. Next, first hashes 1108, 1110, 1112 and 1114 may again be hashed (1140, 1142, 1144, 1146) to form second hashes 1104 and 1106. Second hash 1104 may correspond to first hashes 1108 and 1110, and second hash 1106 may correspond to first hashes 1112 and 1114. Finally, second hashes 1104 and 1106 may be hashed (1150 and 1152) to form a top hash 1102—a single hash that represents data units 1116, 1118, 1120 and 1122, and the intermediary hashes 1108, 1110, 1112, 1114, 1104 and 1106. It should be noted that the number of data units and hashes depicted in FIG. 11 is not intended to be limiting. As described above, the process of hashing hashes may be used to generate a Merkle tree large enough to represent any number of data units with a single top hash as described herein.

Figure 10:
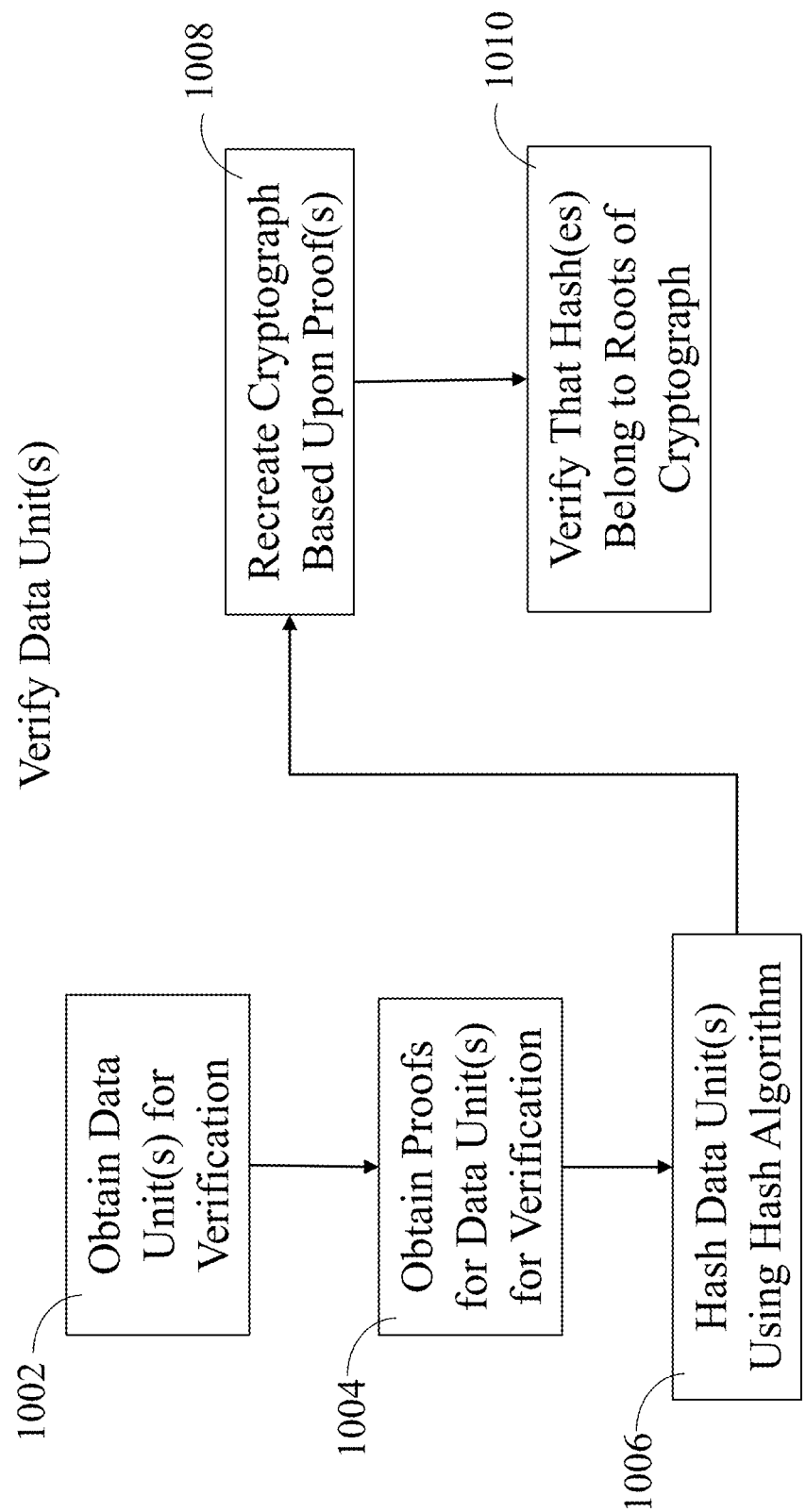
FIG. 10 is a flow diagram depicting a method for verifying a data unit in accordance with embodiments of the present invention.

A process for verifying a data unit is depicted in FIG. 10. The first step is obtaining the data unit for verification, at step 1002, then obtain proofs for the data units (created at step 910 in FIG. 9) for verification, at step 1004. Using, for example, a conventional hash algorithm, the data unit is hashed at step 1006 to recreate the cryptograph based upon proofs, at step 1008. Finally, at step 1010, the present invention verifies that the hash(es) belong to the roots of the cryptograph. The process (method) depicted in FIG. 10 thus represents an embodiment of the present invention for verifying a transaction.

Figure 12:
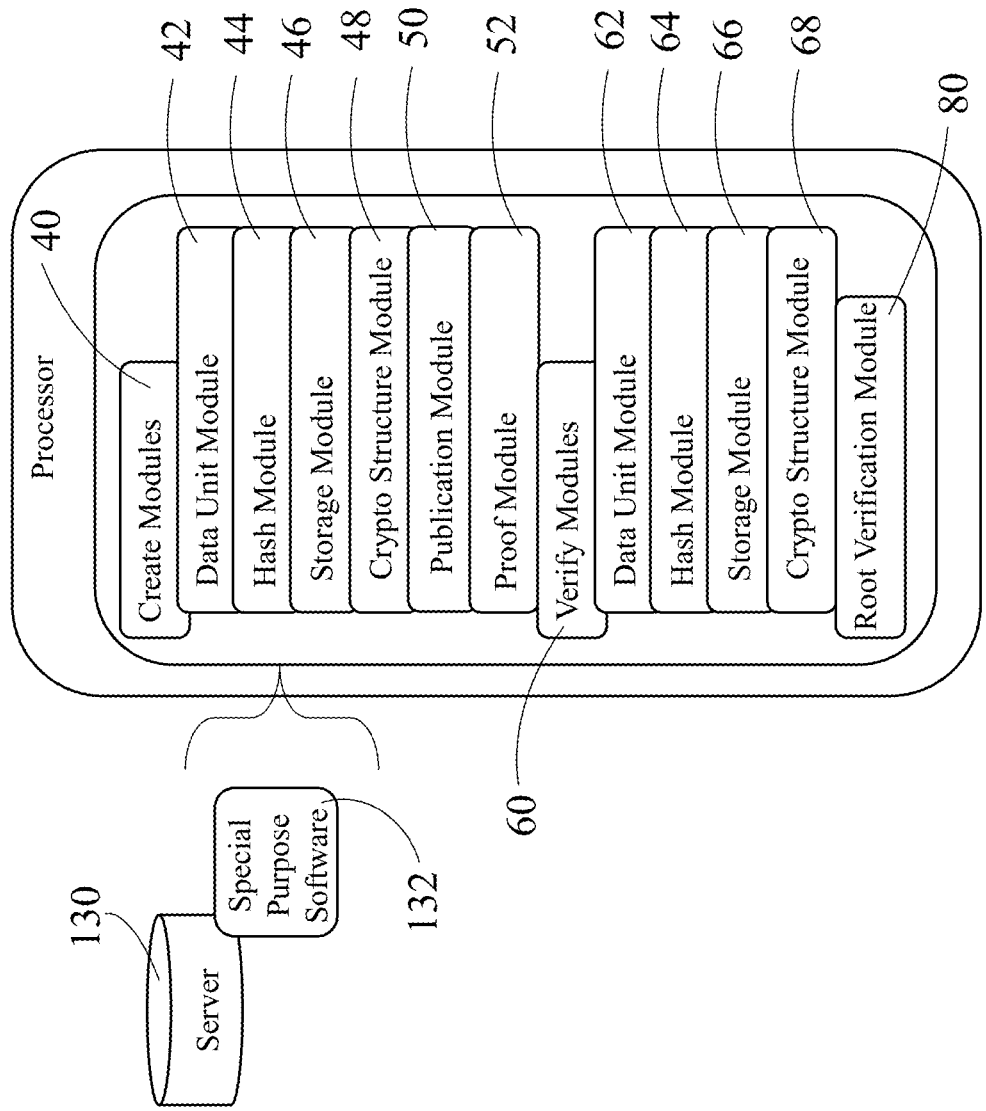
FIG. 12 depicts an illustrative, non-limiting embodiment of special purpose software for carrying-out certain security aspects of the present invention.

An illustrative, non-limiting embodiment of special purpose software 132 for carrying-out certain security aspects in accordance with the present invention is depicted in FIG. 12. The special purpose software may comprise a plurality of create modules 40, including a data unit module 42, a hash module 44, a storage module 46, a cryptographic structure module 48, a publication module 50, and a proof module 52. The special purpose software may also comprise a plurality of verify modules 60, including a data unit module 62, a hash module 64, a storage module 66, and a cryptographic structure module 68. The special purpose software may in addition comprise a root verification module 80.

Although specific example embodiments have been described, it will be evident that various modifications and changes may be made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This description, therefore, is not to be taken in a limiting sense, and the scope of various embodiments is defined only by the appended claims, along with the full range of equivalents to which such claims are entitled.

What is claimed is:

1. A system configured to secure a transaction requested by a user for execution by an electronic device, the transaction request initiated by the user using a user electronic device in communication with a network, the system comprising:
   a smart box in communication with the network and the electronic device, the smart box having a processor and memory having stored therein general purpose software and having storable therein smart box special purpose software, the smart box being configured to provide instructions to the electronic device for executing the requested transaction;
   a user device control installable on the user electronic device, wherein the user device control enables the user to provide the transaction request for initiating the transaction, the transaction request indicating one or more user-defined parameters of the transaction; and
   at least one bot storable in memory of the smart box, configured to collect data for the transaction request, and pertaining to at least one of the user, a process or the transaction,
   wherein the smart box is further configured to:
      transmit the data for the transaction request via the network to an analysis engine of a server, the analysis engine configured to determine whether the transaction is an anomaly and determine a risk level associated with the transaction,
      receive a request disposition from the risk analysis engine via the network, the request disposition indicating the risk level, and
      provide instructions to the electronic device that adjust one or more of the one or more user-selected characteristics of the transaction request when the risk level is intermediate between a first predetermined threshold and a second predetermined threshold.

2. The system according to claim 1, further comprising a user account file associated with the user and stored in a memory of the server, the user account file containing at least one user permission, wherein the at least one bot is configured to collect data corresponding to the at least one user permission, and to provide this data to the server, wherein a processor of the server is configured to determine whether to allow or deny the transaction comparing the data with the at least one user permission.

3. The system according to claim 1, wherein the smart box processor is configured to cause the at least one bot to transmit the data for the transaction request to the server, and wherein the smart box is configured to deny the transaction when the transaction is an anomaly having a risk level that exceeds the second predetermined threshold.

4. The system according to claim 1, wherein the smart box processor is configured to cause the bot to transmit the data for the transaction request to the server, and wherein the smart box processor is configured to allow the transaction when the transaction is an anomaly having a risk level that is below the first predetermined threshold.

5. The system according to claim 3, wherein the smart box processor is configured to cause the at least one bot to transmit the data to the server, and to notify an administrator when the transaction is an anomaly that exceeds the second predetermined threshold, to receive an instruction from the administrator with regard to the task request, and to cause the smart box processor to carry-out the instruction from the administrator.

6. The system according to claim 1, wherein the transaction comprises at least one of accessing, controlling or manipulating the electronic device.

7. The system according to claim 1, wherein the transaction comprises causing the electronic device to execute a command.

8. The system according to claim 1, wherein the transaction comprises executing a command on the electronic device.

9. The system according to claim 1, wherein the electronic device is a multi-function printer (MFP), and wherein the smart box is connectable to the MFP as a super-user.

10. The system according to claim 1, wherein the at least one bot comprises machine executable instructions that, when executed, cause the smart box processor to collect data about the transaction that may be used by the smart box processor to access, manipulate or control the electronic device.

11. The system according to claim 1, further comprising an application programming interface ("API") on the server configured to receive data from the at least one bot and determine whether the transaction is an anomaly.

12. The system according to claim 11, wherein the API provides blockchain functionality to create a cryptographic structure and to verify a data unit of the data for the transaction request.

13. a method for securing a transaction requested by a user for execution by an electronic device, the transaction request initiates by the user using a user electronic device in communication with a network, the method being performed by at least one processor operable by machine-readable instructions, the method comprising the step of providing a smart box in communication with the network, the smart box having a central processing unit comprising a processor and memory having stored therein general purpose software, and having storable therein at least one bot and smart box special purpose software, the smart box being configured to provide instructions to the electronic device for executing the requested transaction, wherein the smart box special purpose software is configured for: receiving a request to authenticate the user using biometric data of the user; receiving a transaction request to control an electronic device, the transaction request comprising one or more user-selected characteristics of the transaction; collecting data for the transaction request by the at least one bot, wherein the at least one bot is at least one of user-centric, process-centric or transaction-centric; transmitting the data for the transaction request via the network to an analysis engine of a server, the analysis engine configured to determine whether the transaction is an anomaly and to determine a risk level associated with the transaction; receiving a request disposition from the risk analysis engine via the network, the request disposition indicating the risk level; and providing instructions to the electronic device that adjust one or more of the one or more user-selected characteristics of the transaction request when the risk level is intermediate between a first predetermined threshold and below a second predetermined threshold.

14. The method according to claim 13, wherein the at least one bot is a user-centric bot, and further configured to activate in response to a request to authenticate from a specific user.

15. The method according to claim 13, wherein the at least one bot is a process-centric bot, and further configured to activate in response to a request to carry-out a specific process.

16. The method according to claim 13, wherein the at least one bot is a transaction-centric bot, and further configured to activate in response to initiation of the transaction request by the user.

17. The method according to claim 16, wherein the step of receiving a request to authenticate the user using biometric data of the user further comprises receiving an audio signal from an audio input device of the user electronic device or proximate the electronic device.

18. The method according to claim 13, wherein the smart box special purpose software is further configured for providing an application programming interface ("API") to a cloud-based server that hosts the risk analysis engine, wherein the API is configured to receive data for the transaction request from the bot, determine whether the transaction is an anomaly and determine the risk level.

19. The method according to claim 18, wherein the API provides blockchain functionality to create a cryptographic unit from at least one of the data for the transaction request or the biometric data, and to verify this data.

20. The method according to claim 19, wherein the data is for the transaction request.

21. The method according to claim 13, wherein the smart box special purpose software is further configured to allow the transaction request when the request disposition indicates the transaction is an anomaly having a risk level that is below the first predetermined threshold.

22. The method according to claim 13,
wherein the one or more user-selected characteristics of the transaction request identify the electronic device and the smart box adjusts these characteristics by forwarding the transaction request to a second smart box, the second smart box being configured to control a second electronic device to fulfill the transaction request.

23. The method according to claim 13,
wherein the electronic device comprises a multi-function printer (MFP) and the one or more user-selected characteristics of the transaction request define an output of the transaction request that is adjusted by the smart box instructing the MFP to provide fewer than a number of copies identified in the transaction request.

* * * * *